(12) United States Patent
Fernandez

(10) Patent No.: US 12,125,014 B1
(45) Date of Patent: *Oct. 22, 2024

(54) MOBILE PAYMENT SYSTEM AND DOCKING STATION

(71) Applicant: MTech Mobility, LLC, Palm Beach Gardens, FL (US)

(72) Inventor: Anthony S. Fernandez, Jupiter, FL (US)

(73) Assignee: MTech Mobility, LLC, Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,928

(22) Filed: Aug. 15, 2023

Related U.S. Application Data

(63) Continuation of application No. 17/688,450, filed on Mar. 7, 2022, now Pat. No. 11,727,380.

(60) Provisional application No. 63/260,735, filed on Aug. 31, 2021.

(51) Int. Cl.
*H02J 7/00* (2006.01)
*G06F 1/26* (2006.01)
*G06Q 20/20* (2012.01)

(52) U.S. Cl.
CPC .......... *G06Q 20/204* (2013.01); *G06F 1/266* (2013.01); *H02J 7/0045* (2013.01)

(58) Field of Classification Search
CPC .................................................. H02J 7/0045

USPC ......................................................... 320/113
See application file for complete search history.

(56) References Cited

U.S. PATENT DOCUMENTS

| | | | |
|---|---|---|---|
| 8,410,751 B2* | 4/2013 | Terao | H02J 50/12 320/167 |
| 11,727,380 B1* | 8/2023 | Fernandez | G06Q 20/32 705/17 |
| 2014/0249944 A1* | 9/2014 | Hicks | G07G 1/0081 235/383 |
| 2015/0066671 A1* | 3/2015 | Nichols | G07G 3/00 705/18 |
| 2016/0099575 A1* | 4/2016 | Velderman | H02J 7/342 320/113 |

\* cited by examiner

*Primary Examiner* — Yalkew Fantu
(74) *Attorney, Agent, or Firm* — Nicholas Pfeifer; Smith & Hopen, P. A.

(57) ABSTRACT

A merchant payment system designed for a high-traffic merchant. In an embodiment, the merchant payment system comprises a casing, a mobile computing device, a charging regulator, a payment receiver, and a docking station configured to charge the mobile computing device and payment receiver. The outer casing is configured to house the mobile computing device, a charging regulator, and payment receiver. Additionally, the docking station is configured to charge various mobile computing devices (e.g., a tablet or a mobile phone) housed within the casing. Moreover, the docking station is configured to supply a predetermined voltage and current to the charging regulator which in-turn supplies a first predetermined voltage and current to the payment receiver and a second predetermined voltage and current to the mobile computing device.

20 Claims, 22 Drawing Sheets

MOBILE PAYMENT SYSTEM AND DOCKING STATION

CROSS-REFERENCE TO RELATED APPLICATIONS

This nonprovisional application claims priority to and is a continuation of U.S. application Ser. No. 17/688,450 entitled "INTEGRATED MOBILE PAYMENT SYSTEM AND DOCKING STATION" filed Mar. 7, 2022, by the same inventor, which claims the benefit of U.S. Provisional Application No. 63/260,735 entitled "MERCHANT PAYMENT SYSTEM" filed Aug. 31, 2021 by the same inventor, which is incorporated herein by reference in its entirety.

BACKGROUND OF THE INVENTION

1. Field of the Invention

This invention relates, generally, to a merchant payment system. More specifically, it relates to a mobile device and charging system designed for merchants.

2. Brief Description of the Prior Art

As consumers transition more towards payment cards and other digital forms of payment, merchants have begun relying more on mobile payment solutions. These mobile payment solutions require a card reader (hereinafter "payment receiver") and a mobile computing device. The mobile computing device connects to the payment receivers and the merchant's wireless network to process orders and payment information received from the card readers. Ideally, the mobile computing device and the payment receivers are secured in a single casing and can be easily recharged.

However, the mobile computing device and payment receiver typically are independent components with their own unique footprint and charging protocol. Thus, it can be extremely difficult to house both units in a single mobile casing without having to remove each component from the casing to recharge. Moreover, the mobile computing device and payment receiver each typically require a unique proprietary charging cable resulting in a jumbled mess of wires.

Accordingly, what is needed is a new and improved merchant payment system comprising both a mobile computing device and a payment receiver in conjunction with a docking station configured to charge both the mobile computing device and the payment receiver through a single charging input, removing the to remove either the mobile computing device or the payment receiver from the casing. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The unresolved need stated above is now met by a novel and non-obvious invention disclosed and claimed herein. In an aspect, the invention pertains to a merchant payment system. The merchant payment system has a casing housing a mobile computing device, a charging regulator, and a payment receiver. Additionally, the system comprises a docking station configured to charge the mobile computing device, charging regulator, or payment receiver. The docking station may be configured to charge individual components of the mobile computing device, charging regulator, or payment receiver. Moreover, the docking station is configured to charge both the mobile computing device and payment receiver through a charging component.

Another feature of the merchant payment system is that the merchant payment system may comprise a casing, which includes a proximal body and a distal body. Along with this, one or more recesses may be formed in the casing, in order to securely retain a mobile computing device, a payment receiver, and a charging regulator at predetermined locations within the casing. In some embodiments, the casing may also have a first aperture disposed in the casing, a payment receipt aperture disposed in the casing, a user interface aperture disposed in the proximal body, and a strap secured to the casing, so that a user can retain the casing via the strap. Furthermore, the payment receiver configured to be disposed within the casing.

In an embodiment, the payment receiver includes an intake opening such that when the payment receiver is disposed within the one or more recesses the intake opening is positioned in an orientation aligned with the payment receipt aperture. In some embodiments, the payment receipt aperture includes a chip reader slot for a payment instrument. In some embodiments, the payment receipt aperture includes a swiping slot for the payment instrument. In some embodiments, the payment receipt aperture includes both the swiping slot and the chip reader slot for the payment instrument.

In some embodiments, the mobile computing device has a user interface. The user interface is positioned in an orientation aligned with the user interface aperture in the casing as the mobile device is disposed in the casing. In this manner, the user interface is accessible via the user interface aperture. In some embodiments, the user interface aperture includes a button slot to allow a user to engage with a button disposed on the mobile computing device.

Another feature of the merchant payment system is that the charging regulator is configured to be disposed within the casing. The charging regulator further includes a charging port, a first electrical connector configured to be coupled to the payment receiver, and a second electrical connector configured to be coupled to the mobile computing device. In some embodiments, the charging port is configured to receive a predetermined voltage and current from the docking system. Moreover, the docking station may be configured to electrically connect to a power source, providing predetermined voltage and current to the merchant payment system. In this manner, the first electric connector provides the payment receiver with a first predetermined voltage and current, while the second electric connector provides the mobile computing device with a second predetermined voltage and current. In some embodiments, the charging regulator is configured to be oriented within the casing such that the charging port is aligned with the first aperture.

In some embodiments, the docking station includes a plurality of channels. Each of the plurality of channels has a size and shape configured to receive the casing in a predetermined orientation when the casing is housing the mobile computing device, payment receiver, and charging regulator. In addition, the docking station has a second aperture, having electric circuitry with charging pins extending from the second aperture, such that the charging pins can operably engage the charging component. In some embodiments, the charging component is in electrical communication with the power source and is configured to the predetermined voltage and current to the charging regulator. In this manner, the predetermined orientation positions the charging regulator in a location allowing the charging component to supply the predetermined voltage and current to the charging regulator. In some embodiments, the first aperture may be comprised of a plurality of charging ports. In this embodiment, the docking station comprises a plurality of complementary charging components configured to fit within the plurality of charging ports.

Some embodiments further include a plurality of distinct carriages. Each carriage is configured to reside within one of the plurality of channels. Each of the plurality of distinct carriages includes a device receipt and a third aperture. In some embodiments, the device receipt has a size and shape configured to receive a predetermined device in a particular orientation. Additionally, the third aperture is configured to allow the charging component to extend into the device receipt, such that the charging component is in electrical communication with the power source and is configured to charge the predetermined device when the predetermined device is disposed in the device receipt. In some embodiments, the predetermined device comprises the mobile computing device, the charging regulator, and the payment receiver. Accordingly, one of the plurality of distinct carriages is configured to receive the casing housing the mobile computing device, payment receiver, and charging regulator in an orientation in which the charging component is in the location to allow the charging component to transfer the predetermined voltage and current to the charging regulator.

In some embodiments, a power transferring component is configured to transfer electrical power between the docking station and a plurality of charging components extending into at least one of the plurality of distinct carriages. Additionally, the charging regulator includes a plurality of charging ports; wherein the predetermined orientation of the casing includes the charging regulator receiving the plurality of charging components within the plurality of charging ports.

In some embodiments, the intake opening is configured to detect a payment instrument within a first predefined distance. Additionally, the charging regulator is configured to supply a predetermined voltage and current to the payment receiver, thereby activating the payment receiver. In this manner, responsive to the intake opening detecting the payment instrument, the payment receiver is configured to output a first electric signal, indicating the payment receiver is being engaged by the payment instrument. In some embodiments, responsive to receiving the first electrical signal, the mobile computing device records the payment transaction.

In an alternative embodiment, the first electric connector may be configured to supply the predetermined voltage and current to the payment receiver wirelessly. Additionally, the second electric connector may be configured to supply the predetermined voltage and current to the mobile computing device wirelessly. In this alternative embodiment, the charging component may also supply the predetermined voltage and current to the charging port wireless as the electric power is supplied to the docking station through wireless means. Accordingly, first electric connector, second electric connector, charging component, and/or charging port may comprise cany uncoupled charging connectors known in the art. first electric connector, second electric connector, charging component, and/or charging port may comprise an electromagnetic inductive charging pad, a radiative electromagnetic resonant charging bowl, or an uncoupled radio frequency wireless charging component. For ease of reference, the exemplary embodiment described herein denotes wireless connector as an electromagnetic inductive charging pad, but this description should not be interpreted as exclusionary of other wireless charging connectors.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
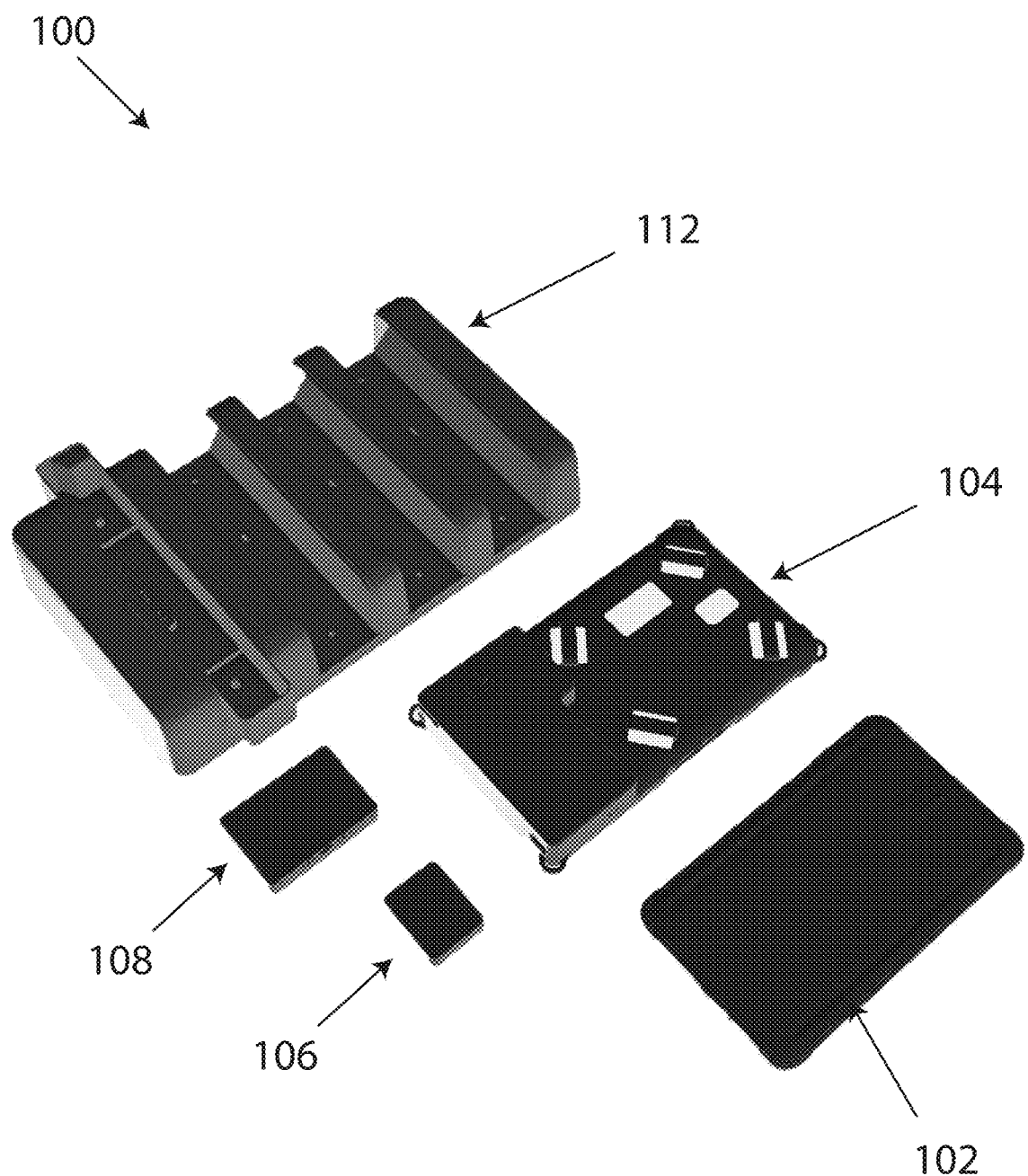
FIG. 1 is a photo of a merchant payment system according to embodiments of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

For purposes of explanation, specific details are set forth to provide an understanding of the disclosure. It will be apparent, however, to one skilled in the art that the disclosed invention can be practiced without these details. Furthermore, it is to be understood that one skilled in the art will recognize that embodiments of the present disclosure, described below, may be implemented in a variety of ways, such as, an apparatus, a system, or a device.

Elements/components shown in diagrams are illustrative of exemplary embodiments of the disclosure and are meant to avoid obscuring the disclosure. Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in other embodiments" or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Any headings used herein are for organizational purposes only and shall not be used to limit the scope of the description or the claims. Furthermore, the use of certain terms in various places in the specification is for illustration and should not be construed as limiting.

As used in this specification and the appended claims, whenever the term "at least," "greater than," or "greater than or equal to" precedes the first numerical value in a series of two or more numerical values, the term "at least," "greater than," or "greater than or equal to" applies to each of the numerical values in that series of numerical values. For example, greater than or equal to 1, 2, or 3 is equivalent to greater than or equal to 1, greater than or equal to 2, or greater than or equal to 3.

As used in this specification and the appended claims, whenever the term "no more than," "less than" or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth to provide a thorough understanding of embodiments of the present technology. It will be apparent, however, to one skilled in the art that embodiments of the present technology may be practiced without some of these specific details. Certain techniques introduced herein can be embodied as special-purpose hardware (e.g., circuitry), as programmable circuitry appropriately programmed with software and/or firmware, or as a combination of special-purpose and programmable circuitry. Hence, embodiments of certain devices may include a machine-readable medium having stored thereon instructions which may be used by a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The present invention includes a merchant payment system. As shown in FIG. 1, merchant payment system 100 comprise a mobile computing device 102, a casing 104, a charging regulator 106, a payment receiver 108, and a strap 110. Additionally, in some embodiments, merchant payment system 100 further includes a docking station 112 configured to charge mobile computing device 102, charging regulator 106, or payment receiver 108. In some embodiments, docking station 112 may be configured to charge individual components of mobile computing device 102, charging regulator 106, or payment receiver 108. Moreover, the docking station 112 is configured to charge both mobile computing device 102 and payment receiver 108 through a charging component 114.

As used herein, the term "mobile computing device 102" refers to any handheld, portable, or mobile computing device known to a person of ordinary skill in the art. For ease of reference, the exemplary figures depict a mobile computing device 102 as a computing tablet which includes a user interface and network connection component(s) for facilitating the transfer of funds between entities, such as consumers and merchants, and the placement of one or more consumer orders.

As used herein, the term "payment receiver 108" may be any device configured to facilitate the transfer of funds between entities, such as consumers and merchants known to a person of ordinary skill in the art. Payment receivers 108 can include one or more components and mechanisms configured to read a payment card/device and facilitate a transfer of funds including but not limited to a magnetic stripe reader, a chip reader, and a contactless reader, but this description should not be interpreted as exclusionary of other devices configured to facilitate the transfer of funds between entities. In some embodiments, the payment receiver 108 includes the necessary network communication systems to independently connect to an internet network or the card reader can integrate with a wireless, wired, or rigid connection with mobile computing device 102 to facilitate a transfer of funds.

As used herein, the term "charging component 114" refers to any charging supplier (e.g., a male USB-C cable, wireless charger, or a male charging pin) known to a person of ordinary skill in the art. While the exemplary figures provided herein depict charging component 114 as one or more male charging pins, this description should not be interpreted as exclusionary of other charging suppliers.

Figure 3:
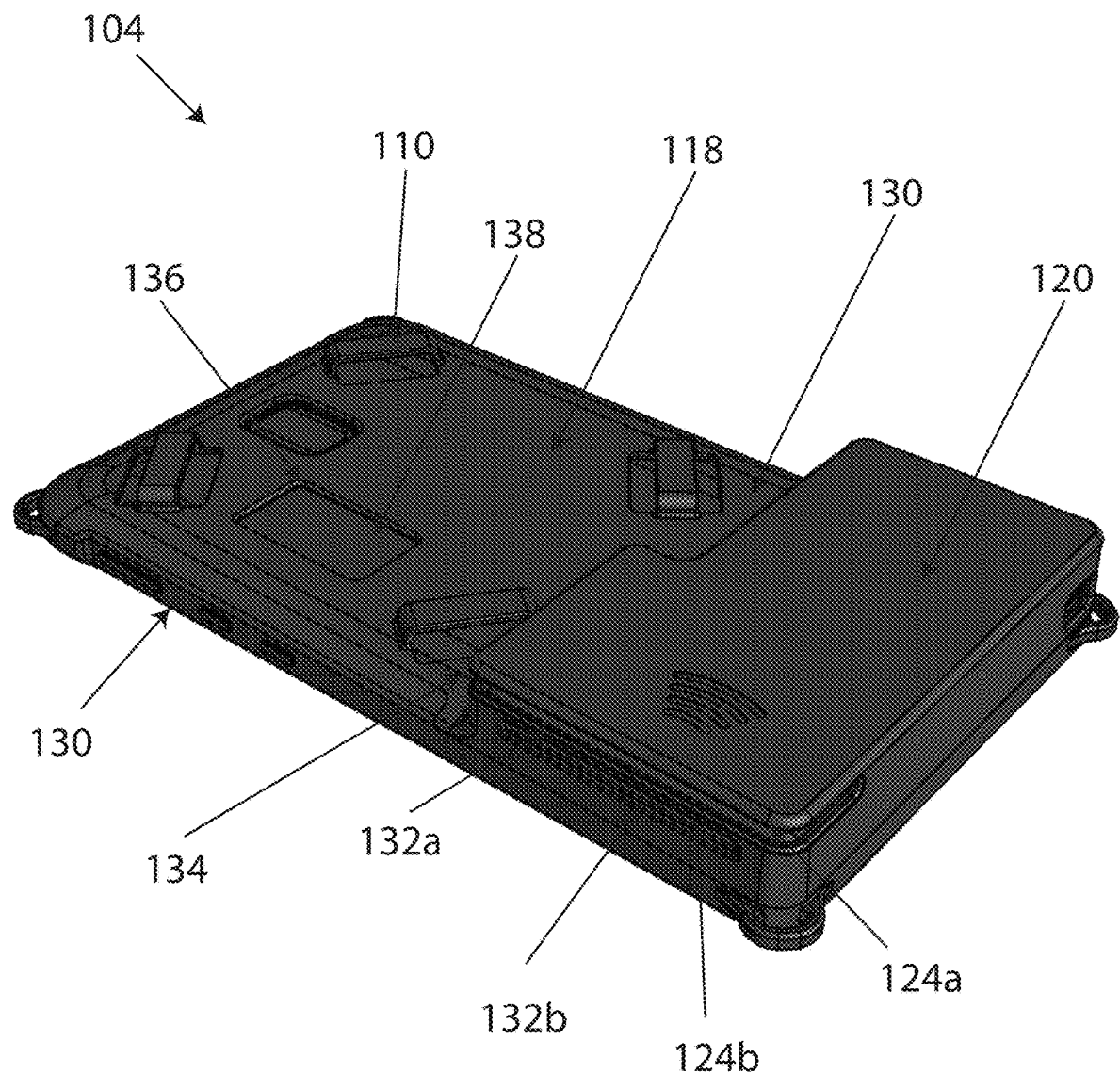
FIG. 3 is a photo of a distal body of a casing housing a payment receiver according to embodiments of the present disclosure.
Figure 4:
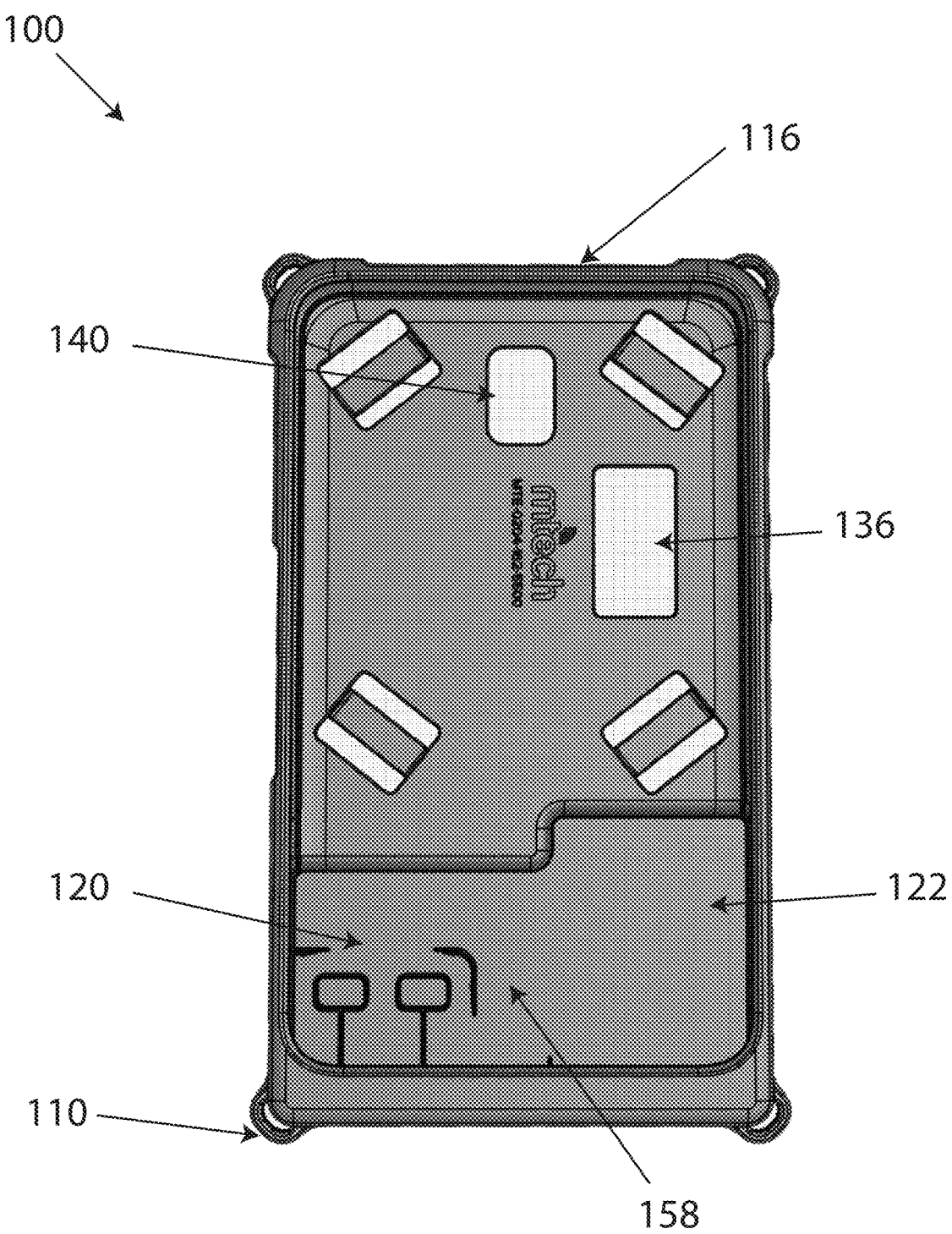
FIG. 4 is a photo of a casing according to embodiments of the present disclosure.

As shown in FIG. 1 and FIGS. 3-4, casing 104 may be configured to house mobile computing device 102, charging regulator 106, and/or payment receiver 108. Casing 104 may include a proximal body 116 ("front body") configured to temporarily interlocked with a distal body 118 ("back body"). Distal body 118 may include one or more recesses (hereinafter "recess") 120 formed in casing 104. Recess 120 may be configured to securely retain mobile computing device 102, charging regulator 106, or payment receiver 108. In some embodiments, a first aperture 122 and a payment receipt aperture 124 may be disposed in casing 104. In some embodiments, casing 104 includes a card swipe aperture 124a and card insert aperture 124b.

In some embodiments, casing 104 is a unitary object with each of the walls integrally formed. In some embodiments, casing 104 does not require any fasteners or other attachment components in which to interlock front body 116 and back body 118 or allow front body 116 and back body 118 to be separated from each other. Moreover, in some embodiments, casing 104 may have a front body 116 having less rigidity than the other walls of the casing. In some embodiments, front body 116 may be a compliant material, allowing repeated contortions from a default position for the insertion and withdrawal of mobile computing device 102 from casing 104. In some embodiments, front body 116 is comprised of a rubber or rubber-like material and back body 118 may be formed of a material that is more rigid than the front wall. Further, back body 118 may comprise a shock/impact resistant material to protect the mobile computing device 102 housed in casing 104. In some embodiments, a plurality of charging ports 156 may be disposed through casing 104.

Figure 2:
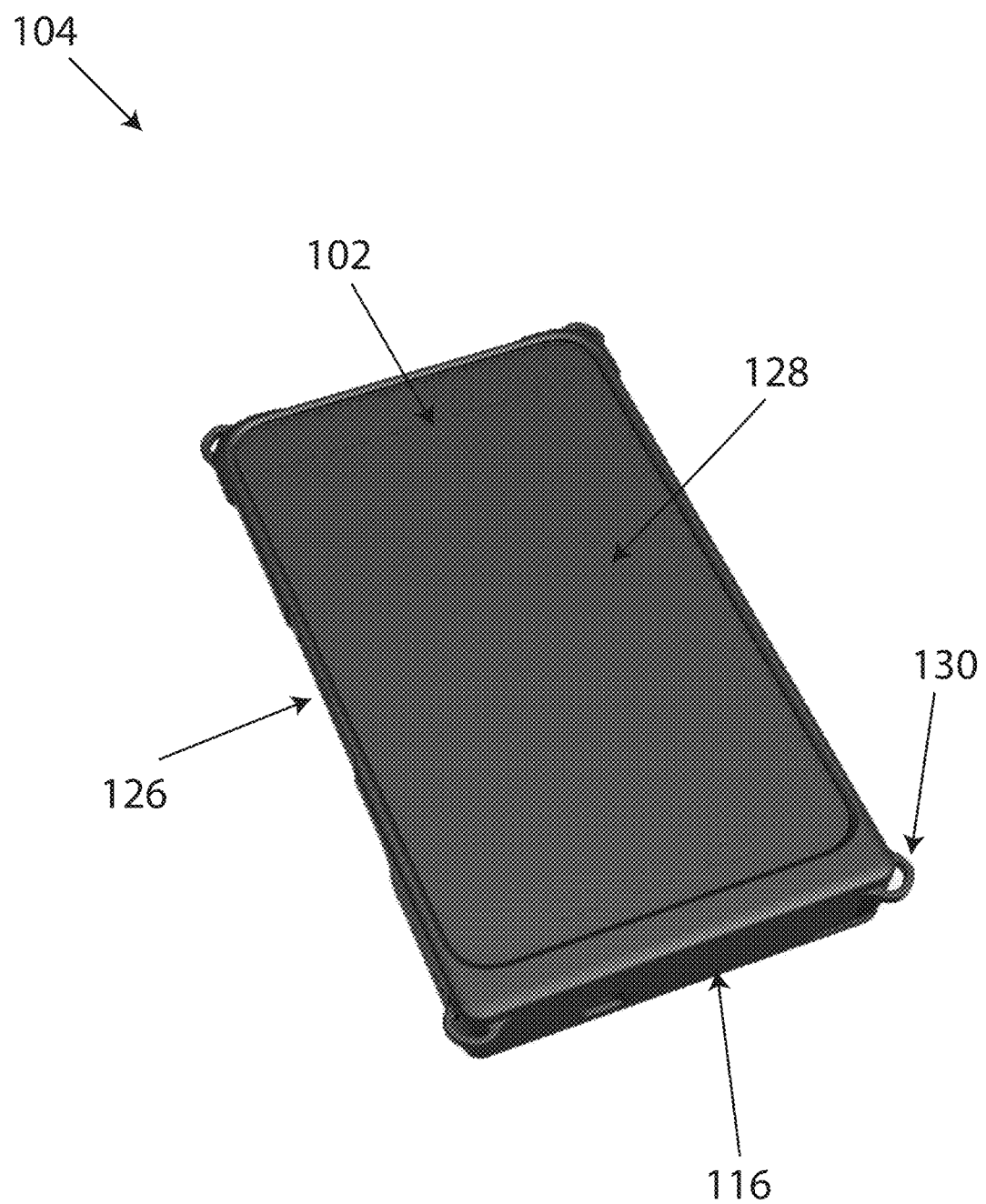
FIG. 2 is a photo of a proximal body of a casing housing a mobile computing device, according to embodiments of the present disclosure.

FIG. 2 depicts mobile computing device 102 encompassed by casing 104. A user interface aperture 126 is disposed in the proximal body. Additionally, user interface 128 of mobile computing device 102 may be positioned in an orientation (e.g., horizontal) aligned with user interface aperture 126 in casing 104, such that user interface 128 is accessible via user interface aperture 128. In some embodiments, user interface aperture 126 may expose one or more buttons, speakers, or cameras provided on user interface 128 of mobile computing device 102 when mobile computing device 102 is secured in casing 104.

FIGS. 2-3 depict casing 104 comprising a strap attachment component 130. Proximal body 116 and distal body 118 of casing 104 may include strap attachment component 130. A strap 110 may be secured to strap attachment component 130. Strap 110 may be adjustable in length to conform to a user (e.g., a hand or a shoulder). In addition, strap attachment component 130 may be disposed about proximal body 116 or distal body 118. In some embodiments, strap attachment component 130 may be disposed on both proximal body 116 and distal body 118. In some embodiments, strap attachment component 130 may be disposed on the corners of proximal body 116 or distal body 118.

Figure 6:
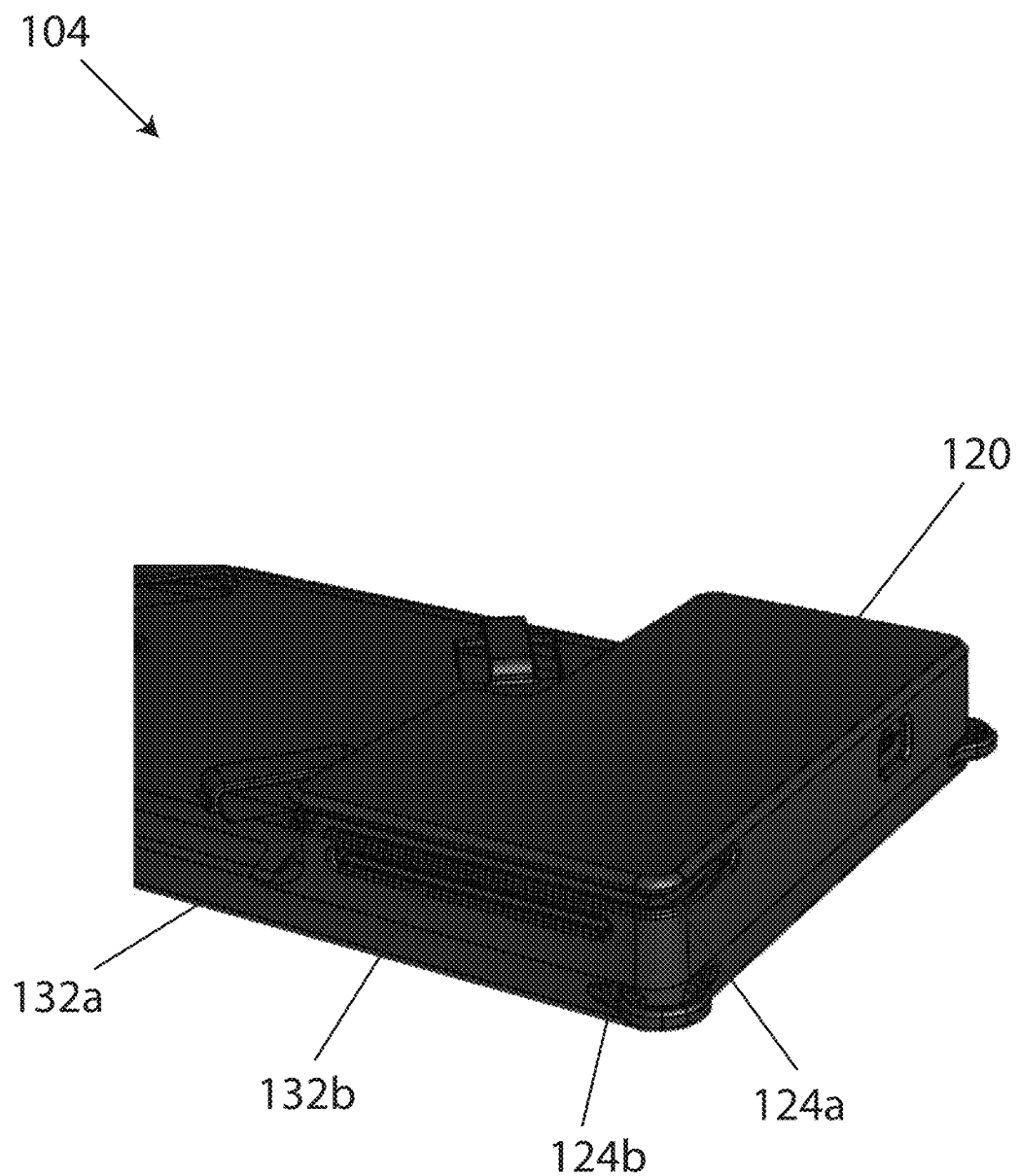
FIG. 6 is a photo of an embodiment of an intake opening (e.g., payment instrument swipe) disposed on a payment receiver disposed within a casing according to embodiments of the present disclosure.
Figure 7:
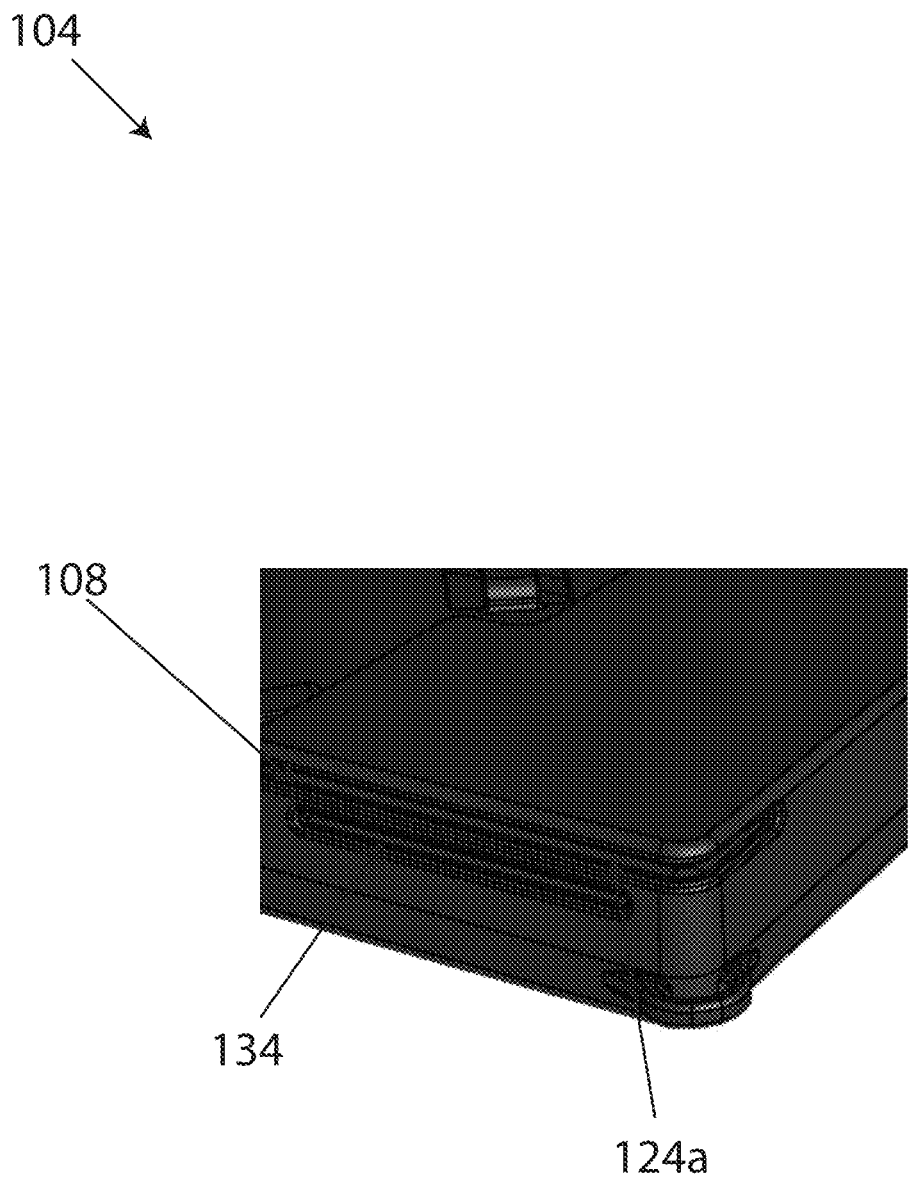
FIG. 7 a up photo an embodiment of an intake opening (e.g., chip reader) disposed on a payment receiver disposed within a casing according to embodiments of the present disclosure.

FIG. 3 and FIG. 6 depict payment receiver 108 disposed within recess 120. In some embodiments, payment receiver 108 may include an intake opening 132 disposed about at least a portion of payment receiver 108. In addition, as shown in FIG. 3, intake opening 132 may be configured to read a transaction component 134 of a payment instrument (e.g., credit card). As used herein, the term "transaction component 134" refers to a magnetic strip, a chip component, a quick response (QR) code, a wireless transaction, or any other component used to facilitate monetary transactions. In some embodiments, intake opening 132 may be positioned in an orientation aligned with the payment receipt aperture 124. In some embodiments, payment receiver 108 may comprise multiple intake openings 132 (e.g., payment instrument swiping slot 132a or payment card chip reader 132b) to facilitate one or more transaction components 134 of a payment instrument.

Additionally, as shown in FIGS. 3-4, an ID aperture 136 may be disposed in casing 104. ID aperture 136 may have a size, shape, and orientation that aligns with the location of an ID indicium 138. In some embodiments, ID aperture 136 is located on distal body 118. In some embodiments, ID aperture 136 may comprise a size, shape, and orientation that aligns with the location of a camera on mobile computing device 102. In some embodiments, a camera aperture 140 may be disposed in recess 120 formed in casing 104. In some embodiments, ID aperture 136 and camera aperture 140 may be disposed within recess 120. In some embodiments, camera aperture 140 may have a size, shape, and orientation that aligns with the location of a camera located on a back of mobile computing device 102.

As depicted in FIG. 4, a portion of recess 120 may extend further distally (towards rear section 118 of casing 104) than the remaining portions of recess 120. As a result, the mobile computing device 102 may be disposed proximal (towards front section 116 of casing 104) to charging regulator 106 and payment receiver 108 within casing 104. In some embodiments, mobile computing device 102 is disposed distally to charging regulator 106 and payment receiver 108 within casing 104.

Figure 5:
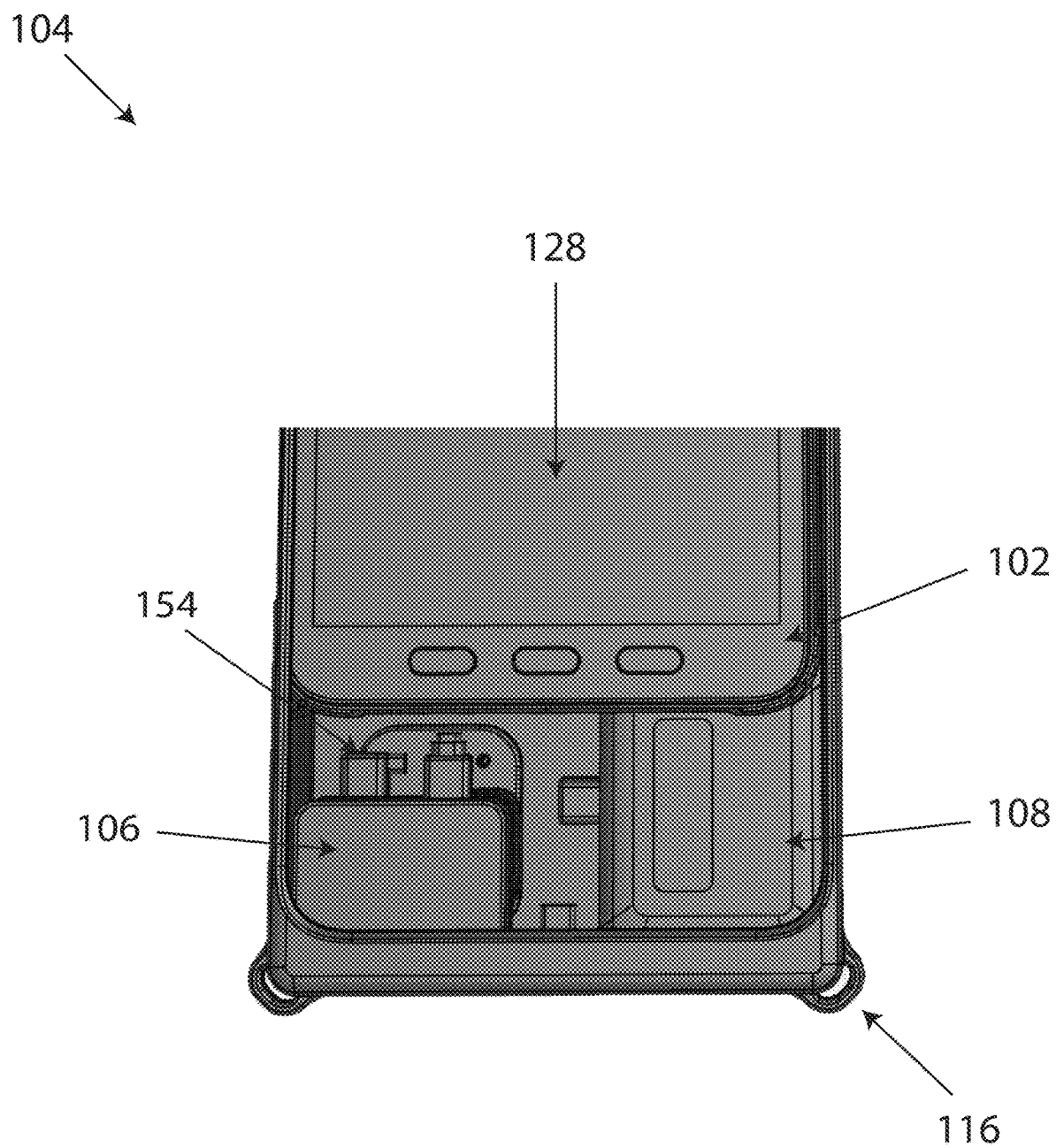
FIG. 5 is a photo of a casing housing a mobile computing device, a charging regulator and a payment receiver, according to embodiments of the present disclosure.

FIG. 5 depicts mobile computing device 102, charging regulator 106 and payment receiver 108 disposed within recess 120 of casing 104. In some embodiments, charging regulator 106 may be configured to be oriented within casing 104 such that a charging port 156 is aligned with first aperture 122. In addition, charging port 156 may be configured to receive electrical power. As used herein, the term "charging port 156" refers to any charging receipts (e.g., a female USB-C cable, wireless charger, or a female charging pin) known to a person of ordinary skill in the art. While the exemplary embodiment depicted in the figures includes charging port 156 as a female charging pin, this description should not be interpreted as exclusionary of other charging receipts.

In some embodiments, a first electric connector 152 of charging regulator 106 may be configured to be coupled to payment receiver 108, while a second electric connector 154 of charging regulator 106 may be configured to be coupled to mobile computing device 102. In some embodiments, first electric connector 152 and second electric connector 154 may be configured to be wireless. Charging regulator 106 may be configured to supply the predetermined voltage and current to mobile computing device 102 and/or payment receiver 108 wirelessly.

Furthermore, charging regulator 106 may be configured to supply voltage and current to merchant payment system 100. In some embodiments, charging regulator 106 is configured to provide a first predetermined voltage and current and a second predetermined voltage and current to mobile computing device 102 and payment receiver 108, respectively. In some embodiments, charging regulator 106 may be configured to supply only the first predetermined voltage and current to both mobile computing device 102 and payment receiver 108. In some embodiments, charging regulator 106 may be configured to supply only the second predetermined voltage and current to both mobile computing device 102 and payment receiver 108.

In some embodiments, a recess pillar 158 may be disposed on recess 120 within casing 104, such that recess pillar 158 segments recess 120 into a first section and a second section. In some embodiments, charging regulator 106 may be disposed within the first section of recess 120, while payment receiver 108 may be disposed within the second section of recess 120.

Figure 8:
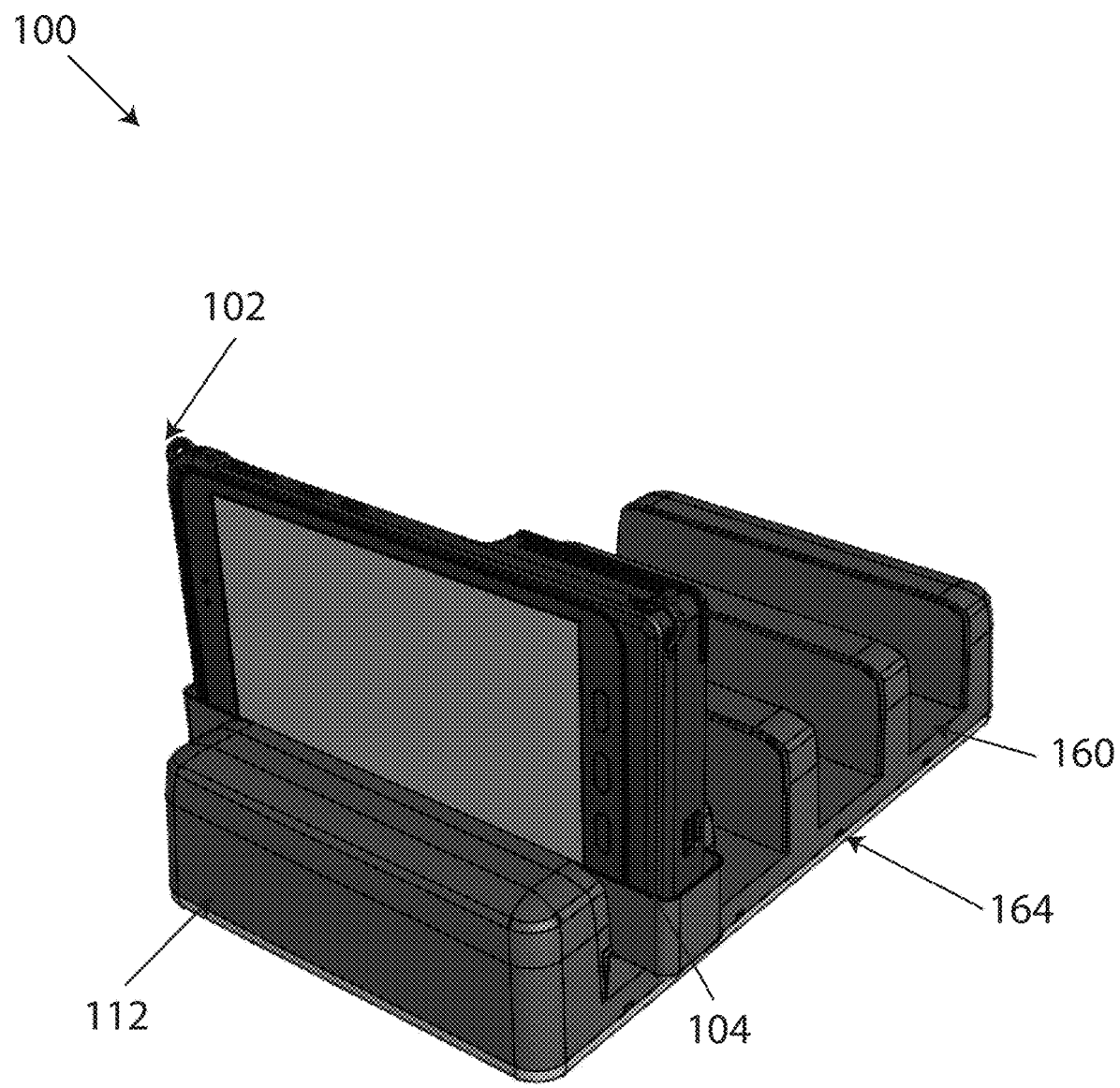
FIG. 8 is a photo of a casing housing a mobile computing device disposed within a docking station according to embodiments of the present disclosure.

FIG. 8 depicts docking station 112 comprising a plurality of channels 160. Each of the plurality of channels 160 may have a size and shape configured to receive casing 104 in a predetermined orientation (e.g., horizontal) when casing 104 is housing mobile computing device 102, charging regulator 106, and/or payment receiver 108. In some embodiments, multiple mobile computing devices 102 may be disposed within docking station 112, simultaneously.

In some embodiments, casing 104 housing mobile computing device 102, charging regulator 106, and/or payment receiver 108 may be configured to align in an alternative orientation (e.g., vertical). In some embodiments, casing 104 housing mobile computing device 102, charging regulator 106, and/or payment receiver 108 may be configured to align in an alternative orientation (e.g., vertical) in response to changes in location of charging port 156.

As previously noted, docking station 112 is configured to electrically connect to a power source using e.g., an electrical cable connected to a port (see port 211 in FIG. 21), such that the power source supplies the docking station with a predetermined voltage and current. Docking station 112 also includes charging component 114, where charging component 114 is configured to provide a predetermined electrical voltage and current to charging regulator 106. FIG. 8 further depicts casing 104, and in turn, charging regulator 106 in the predetermined orientation, such that charging component 114 can transfer the predetermined electrical voltage and current to charging regulator 106. In some embodiments, plurality of channels 158 may be sized and shaped individually to receive a casing 104 housing a specifically formed mobile computer device 102 (e.g., a tablet or a phone), charging regulator 106, and/or payment receiver 108.

Figure 9:
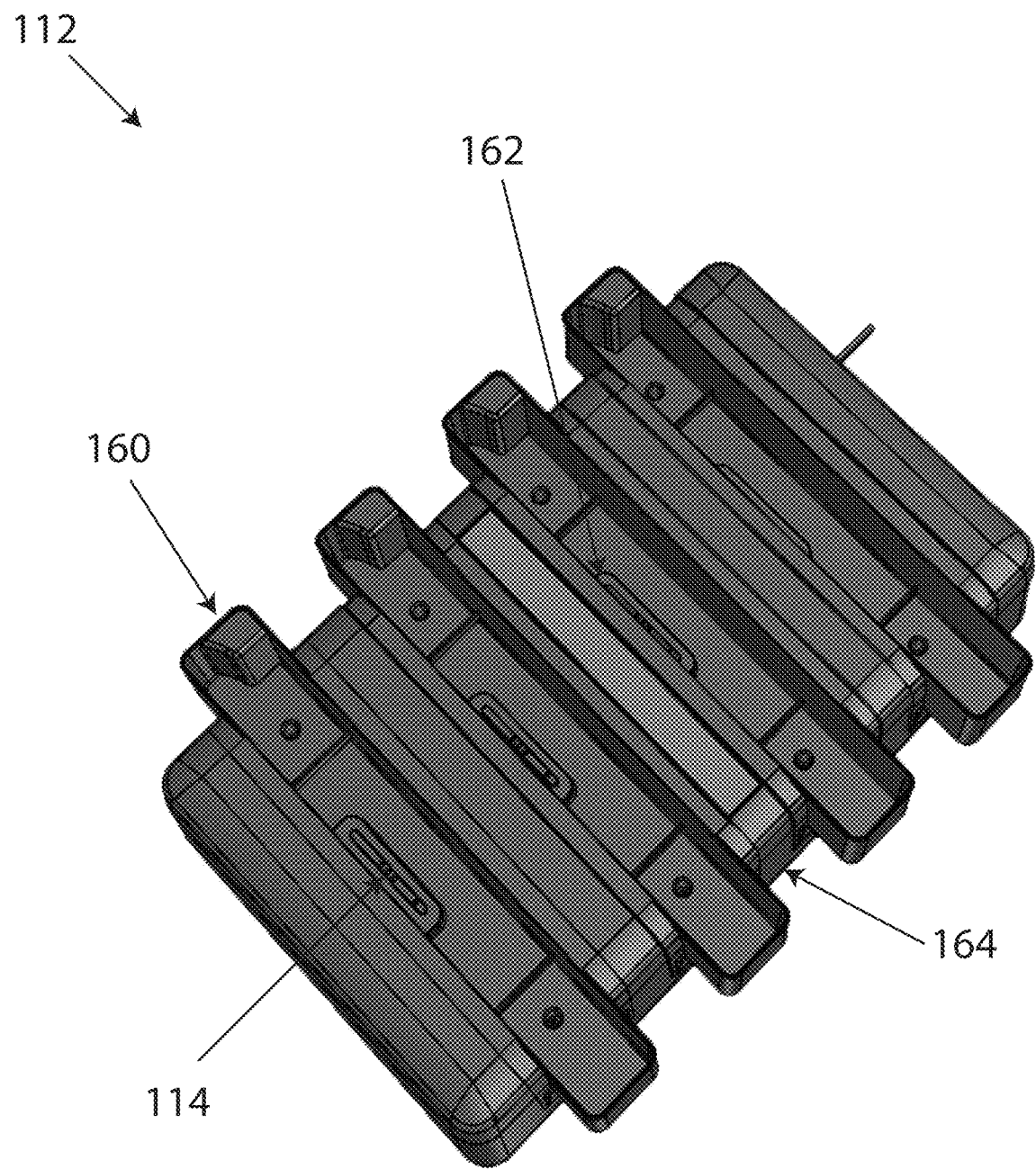
FIG. 9 is a photo of a docking station according to embodiments of the present disclosure.
Figure 10:
FIG. 10 is a photo of a plurality of channels disposed within a docking station according to embodiments of the present disclosure.

FIGS. 9-10 depict docking station 112 comprising a charging pillar 162 disposed within each of the plurality of channels 160, in which charging component 114 is disposed upon charging pillar 162. Charging pillar 162 configured to be aligned and received by charging port 156. In some embodiments, charging pillar 162 provides a predetermined electrical voltage and current from docking station 110 to charging regulator 106 and subsequently computing device 102 and payment receiver 108. In some embodiments, charging regulator 106 and docking station 110 may use alternative charging methods. In some embodiments, charging component 114 and charging port 156 may be configured to charge wirelessly. In some embodiments, mobile computing device 102 may comprise a charging regulator. In some embodiments, mobile computing device 102 may be configured and aligned to receive charging component 114.

As shown in FIGS. 8-9, a charging light 164 may be disposed on docking station 112. Charing light 162 may indicate the power level of the mobile computing device 102. In some embodiments, charging light 164 may be programmed to alternate luminescent color (e.g., red to green) in response to docking station 112 detecting an increase or decrease to a predetermined battery level in mobile computing device 102 or payment receiver 108. In some embodiments, if the predetermined battery level is between zero and a first threshold (e.g., 25%), then the luminescent color may be red. Additionally, if the predetermined battery level is between the first threshold and a second threshold (e.g., 75%), then the luminescent color may be yellow. Finally, if the predetermined battery level is between the second threshold and a third threshold (e.g., 100%), then the luminescent color may be green.

Figure 11:
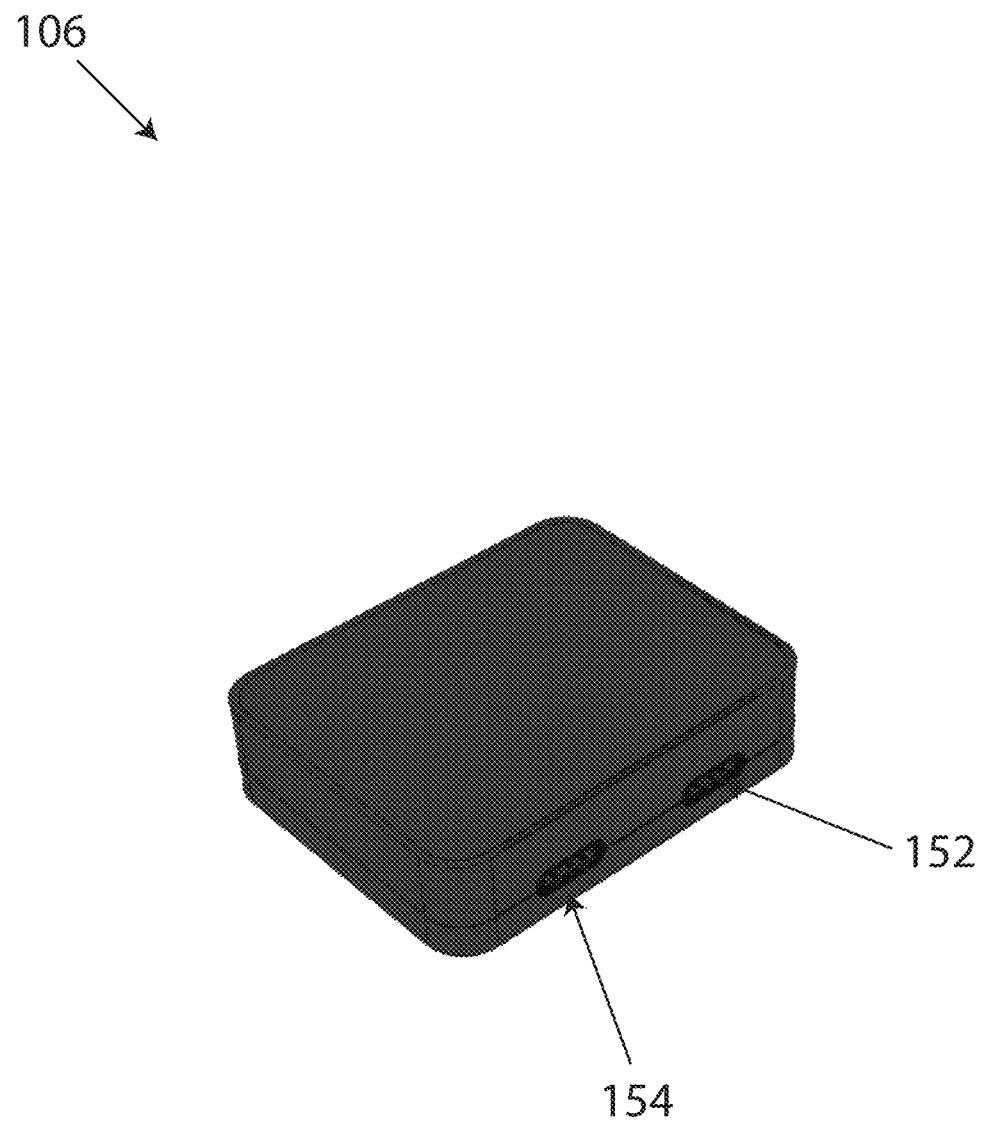
FIG. 11 is a photo of a charging regulator according to embodiments of the present disclosure.

As shown in FIG. 11, charging regulator 106 may comprise first electric connector 152 and second electric connector 154. Moreover, charging regulator 106 is configured to control the distribution of predetermined voltage or current to mobile computing device 102 and/or payment receiver 108. In some embodiments, charging regulator 106 may regulate the predetermined voltage and current passing through charging component 114 to mobile computing device 102 and/or payment receiver 108. In some embodiments, charging regulator 106 may increase or decrease the predetermined voltage or current in response to the predetermined battery level of mobile computing device 102 or payment receiver 108.

Figure 12:
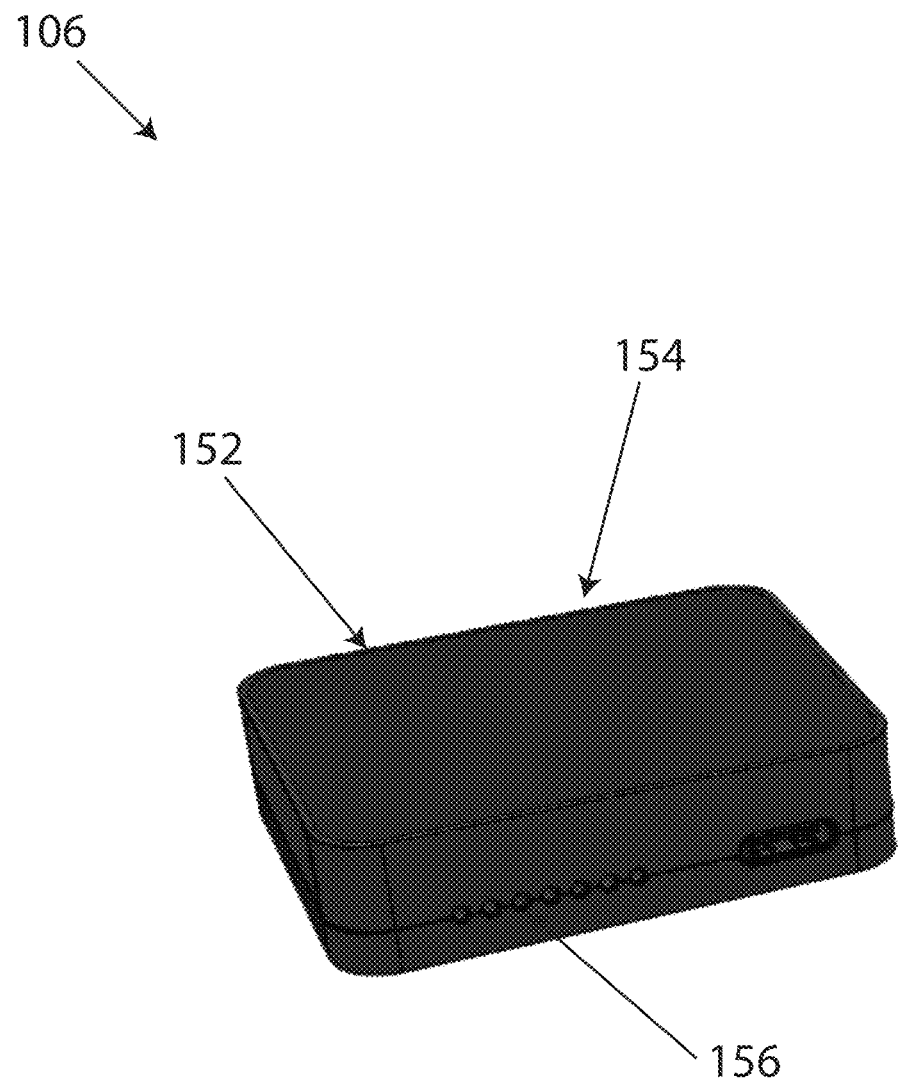
FIG. 12 is a photo of a charging port disposed on a charging regulator according to embodiments of the present disclosure.

FIG. 12 depicts charging ports 156 disposed on charging regulator 106. Charging ports 156 are configured to receive charging component 114 of docking station 112. In some embodiments, charging ports 156 may be disposed on mobile computing device 102 or payment receiver 108. In some embodiments, mobile device 102 or payment receiver 108 may be configured to bypass charging regulator 106 and align in an orientation to receive charging component 114.

In another aspect of the present invention, as shown in FIG. 13, FIG. 15, and FIGS. 17-18, a merchant payment system 200 comprises a mobile computing device 202, a casing 204, a charging regulator 206, a payment receiver 208, and a strap 210. Additionally, in some embodiments, merchant payment system 200 further includes a docking station 212 configured to charge mobile computing device 202, charging regulator 206, and/or payment receiver 208. Docking station 212 may be configured to charge mobile computing device 202, charging regulator 206, and/or payment receiver 208 through a charging component 214.

Figure 13:
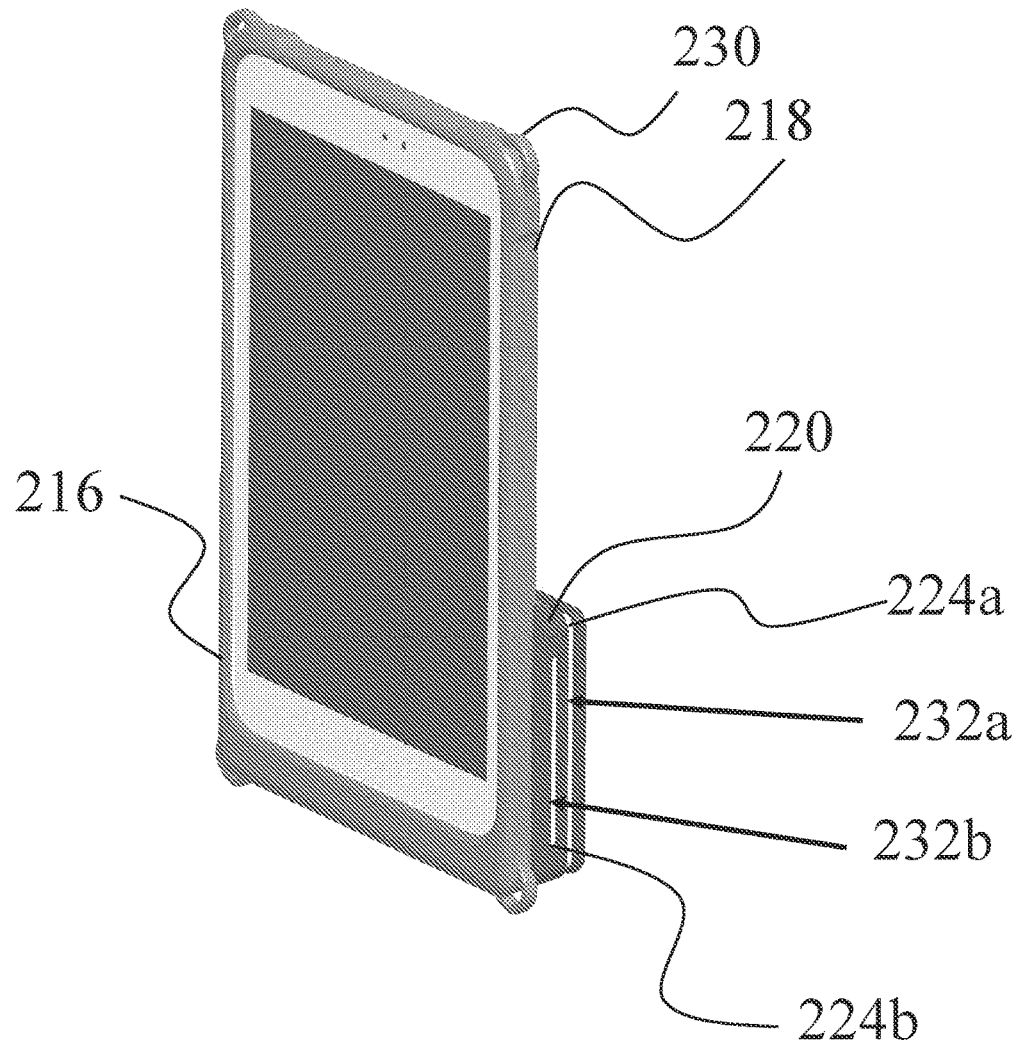
FIG. 13 is a perspective view of a casing housing a payment receiver according to embodiments of the present disclosure.
Figure 14:
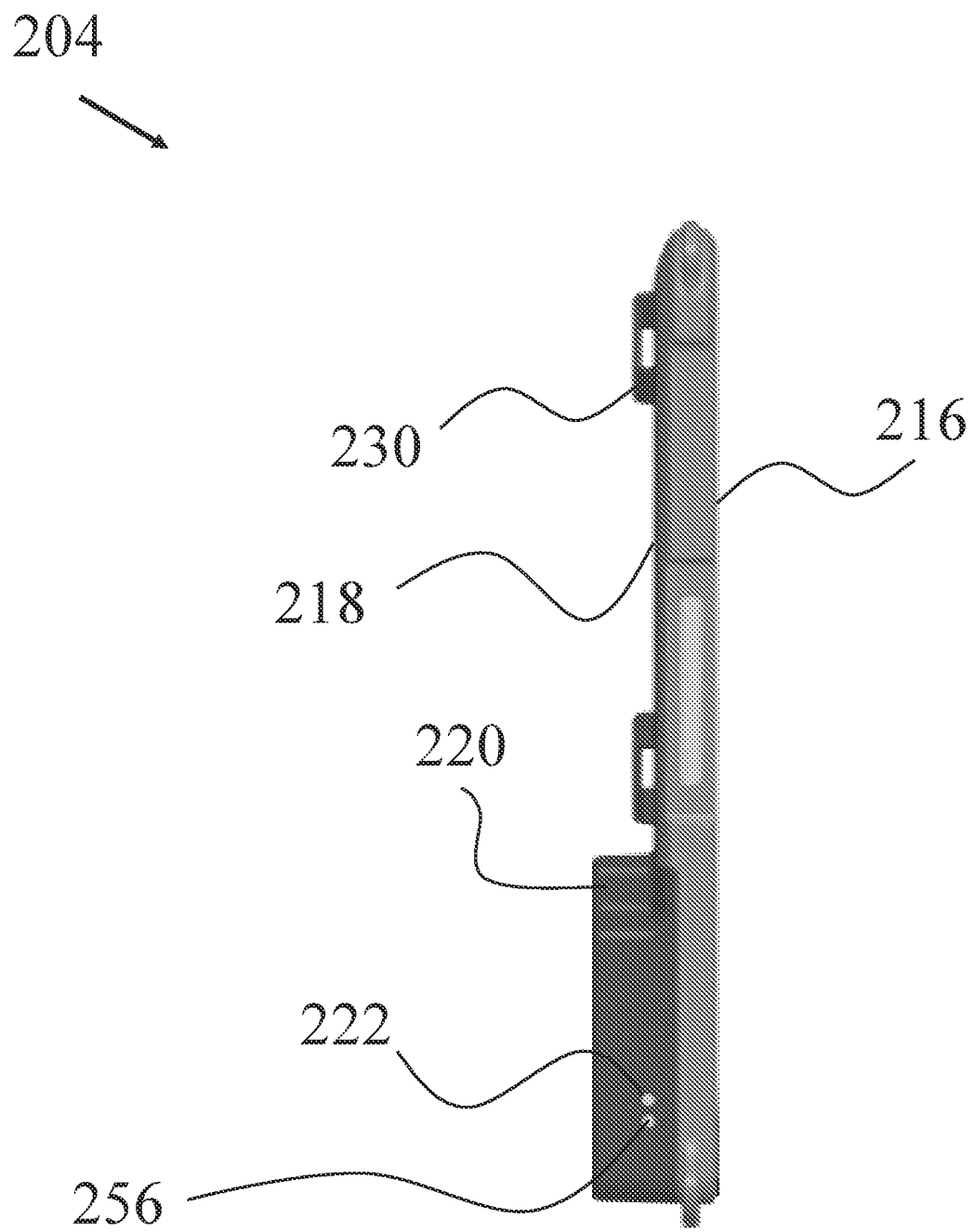
FIG. 14 is a perspective view of a casing housing a charging receptor according to embodiments of the present disclosure.

As shown in FIGS. 13-14 casing 204 may house mobile computing device 204, charging regulator 206, and/or payment receiver 208. Casing 204 may include a proximal body 216 (also referred to as a "front body section") configured to permanently or temporarily interlocked with a distal body 218 (also referred to as a "rear body section").

In some embodiments, casing 204 is a unitary object with each of the walls integrally formed. In some embodiments, casing 204 does not require any fasteners or other attachment components in which to interlock front body 216 and back body 218 or allow front body 216 and back body 218 to be separated from each other. Moreover, in some embodiments, casing 204 may have a front body 216 having less rigidity than the other walls of the casing. In some embodiments, front body 216 may be a compliant material, allowing repeated contortions from a default position for the insertion and withdrawal of mobile computing device 202 from casing 204. In some embodiments, front body 216 is comprised of a rubber or rubber-like material. Rear body 218 may be formed of a material that is more rigid than the front wall. Further, rear body 218 may comprise a shock/impact resistant material to protect the mobile computing device 202 housed in casing 204. In some embodiments, a plurality of charging ports 256 may be disposed through the casing.

Distal body 218 may further include one or more recesses (hereinafter "recess") 220 formed in casing 204. Recess 220 may be configured to securely retain mobile computing device 204, charging regulator 206, and/or payment receiver 208. In some embodiments, first aperture 222 and payment receipt aperture 224 are disposed in casing 204.

As depicted in FIG. 14, a portion of recess 220 may extend further distally than the remaining portions of recess 220. As a result, the mobile computing device 202 may be disposed proximal to charging regulator 206 or payment receiver 208 within casing 204. In some embodiments, mobile computing device 202 is disposed distally to charging regulator 206 or payment receiver 208 within casing 204.

Figure 15:
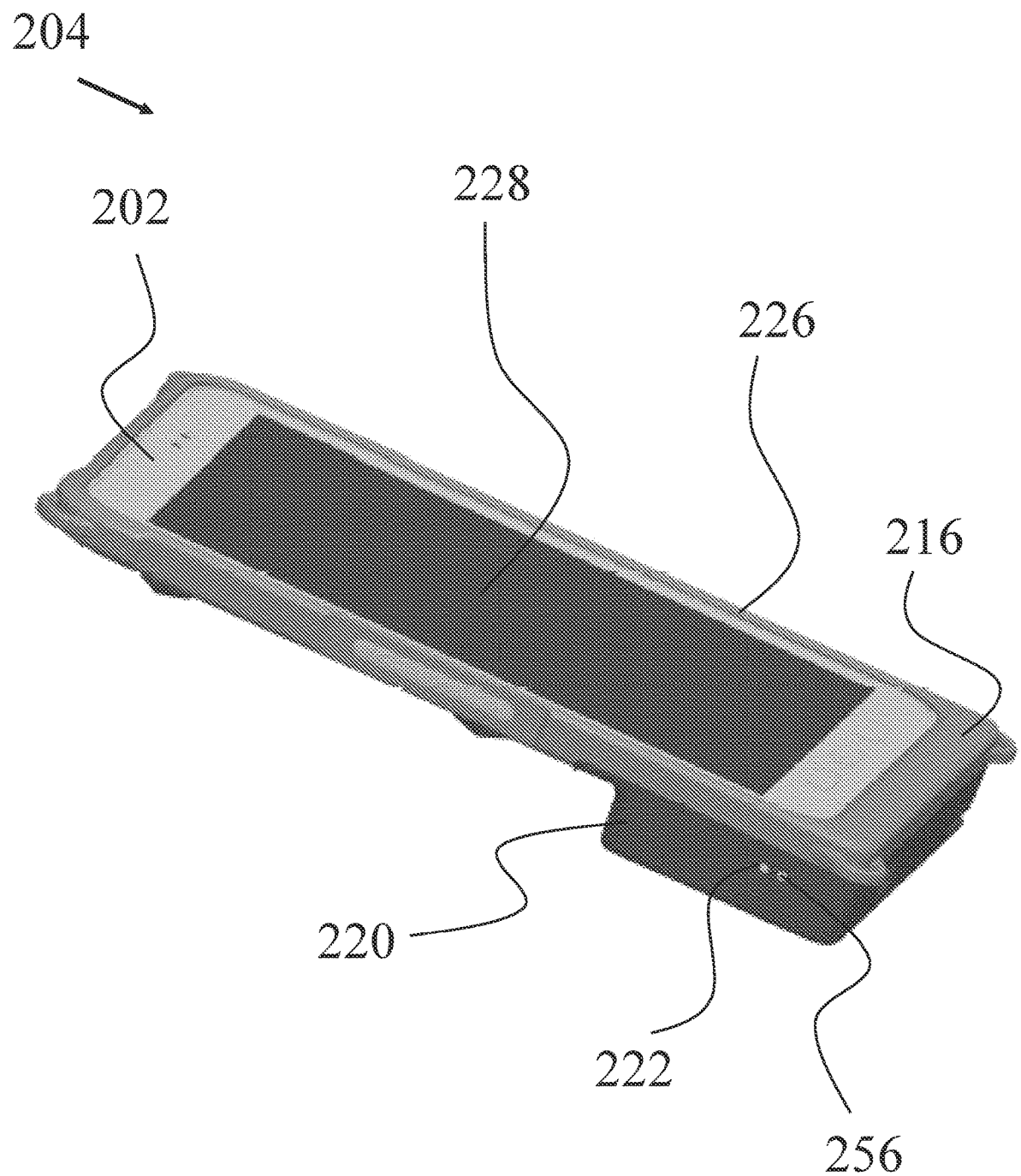
FIG. 15 is a perspective view of a casing housing a mobile computer device according to embodiments of the present disclosure.

FIG. 15 further depicts mobile computing device 202 encompassed by casing 204. In some embodiments a user interface aperture 226 is disposed in proximal body 216. Additionally, a user interface 228 of mobile computing device 202 may be positioned in an orientation (e.g., horizontal) aligned with user interface aperture 226 in casing 204, such that user interface 228 is accessible via user interface aperture 228. In some embodiments, user interface aperture 226 may expose one or more buttons, speakers, or cameras provided on user interface 228 of mobile computing device 202 when mobile computing device 202 is housed within casing 204.

Figure 16:
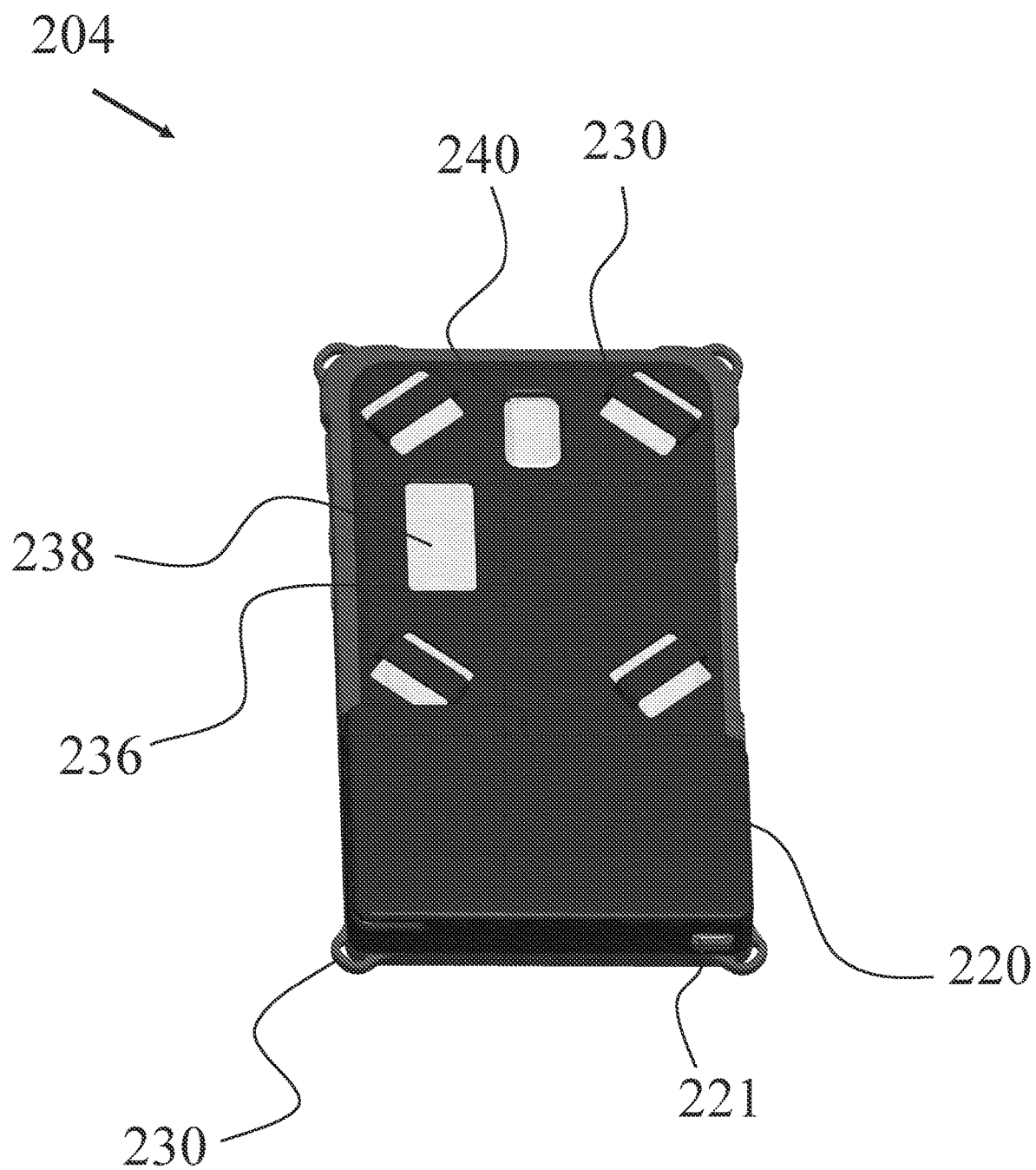
FIG. 16 is a perspective view of a distal body of a casing according to embodiments of the present disclosure.

FIG. 16 depicts casing 204 comprising a strap attachment component 230. In some embodiments, proximal body 216 and distal body 218 of casing 204 may include strap attachment component 230. A strap may be secured to strap attachment component 230. In some embodiments, the strap may be adjustable in length to conform to a user (e.g., a hand or a shoulder). In addition, strap attachment component 230 may be disposed about proximal body 216 or distal body 218. In some embodiments, strap attachment component 230 may be disposed on both proximal body 216 and distal body 218. In some embodiments, strap attachment component 230 may be disposed the corners of proximal body 216 or distal body 218.

Additionally, as shown in FIG. 16 an ID aperture 236 may be disposed in casing 204. ID aperture 236 may have a size, shape, and orientation that aligns with the location of an ID indicium 238. In some embodiments, ID aperture 236 is located on distal body 218. In some embodiments, ID aperture 236 may comprise a size, shape, and orientation that aligns with the location of a camera on mobile computing device 202. In some embodiments, a camera aperture 240 may be disposed in recess 220 formed in casing 204. As shown in FIG. 16, in some embodiments, ID aperture 236 and camera aperture 240 may be disposed within recess 220. In some embodiments, camera aperture 240 may have a size, shape, and orientation that aligns with the location of a camera located on a back of mobile computing device 202.

Some embodiments of casing 204 further include an additional power port aperture 221 configured to align with a conventional power port of charging regulator 206 or payment receiver 208. Some embodiments may include multiple additional power port apertures with one aligning with a conventional power port of charging regulator 206 and another aligning with a conventional power port of payment receiver 208.

Figure 17:
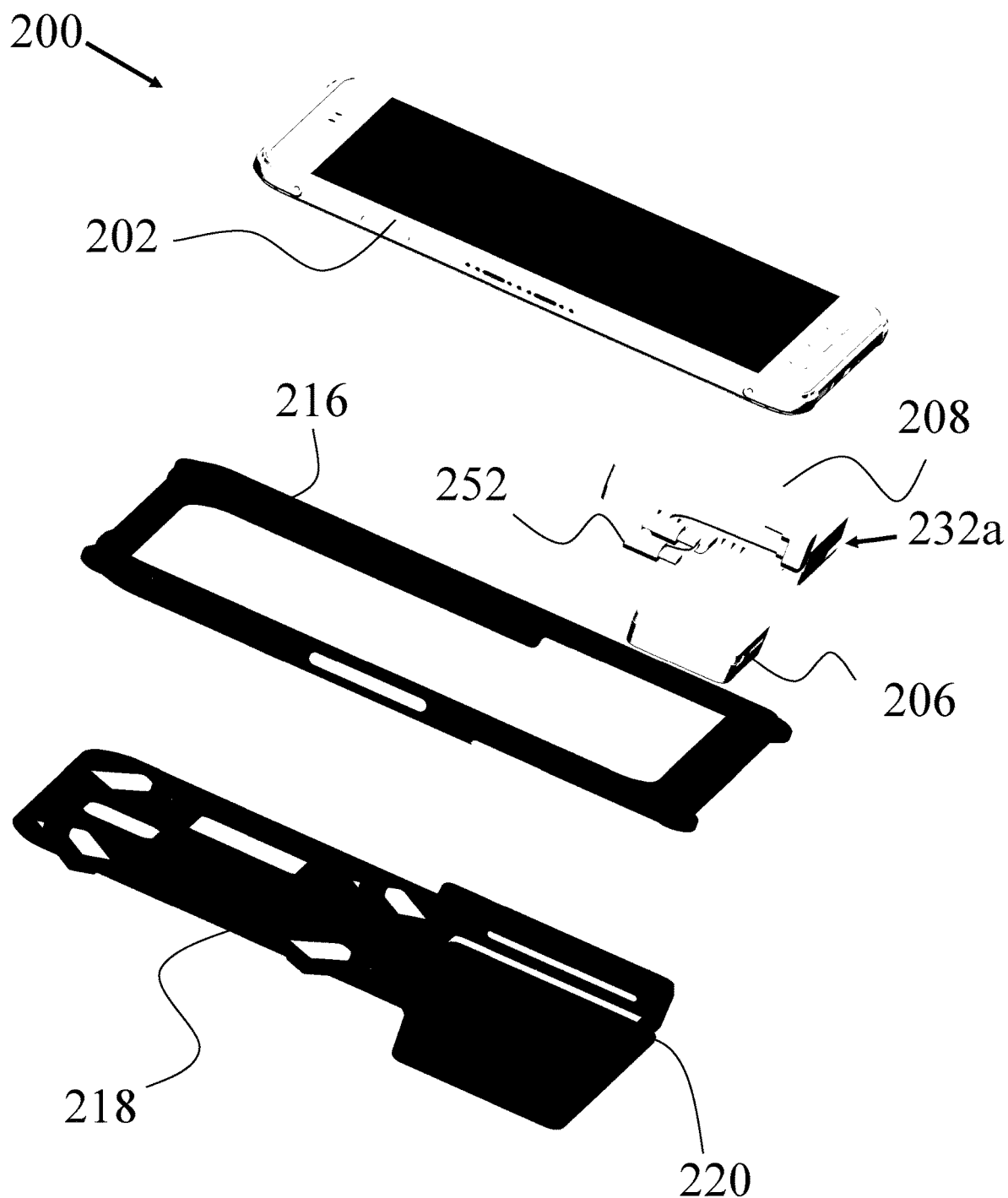
FIG. 17 is a perspective view of a mobile payment system comprising a mobile computing device, a charging receptor, a payment receiver, a proximal body, and a distal body according to embodiments of the present disclosure.

FIG. 17 depicts mobile computing device 202, charging regulator 206, payment receiver 208, proximal body 216, and distal body 218 separated into individual components. In some embodiments, charging regulator 206 and payment receiver 208 both interact wirelessly (e.g., Bluetooth or wireless charging methods). Charging regulator 206 and/or payment receiver 208 may be disposed within recess 220.

In some embodiments, payment receiver 208 may include an intake opening 232 disposed about at least a portion of payment receiver 208. As shown in FIG. 13 and FIG. 17, intake opening 232 may be configured to read transaction component 234 of a payment instrument (e.g., credit card). In some embodiments, intake open 232 may be positioned in an orientation aligned with the payment receipt aperture 224. In some embodiments, payment receiver 208 may comprise multiple intake openings 232 (e.g., payment instrument swiping slot 232a or payment card chip reader 232b) to facilitate one or more transaction components 234 of a payment instrument.

In some embodiments, as payment receiver 208 is activated through the predetermined voltage and current supplied by charging regulator 206, responsive to the intake opening 232 detecting the payment instrument, payment receiver 208 is configured to output a first electrical signal. In some embodiments, subsequent to intake opening detecting the payment instrument, payment receiver 208 is configured to output a first electric signal, indicating that payment receiver 208 is currently being engaged by the monetary instrument. Additionally, responsive to receiving the first electrical signal, mobile computing device 204 records the payment transaction through the use of the payment instrument.

FIGS. 13-14 and FIG. 17 depict mobile computing device 202, charging regulator 206 or payment receiver 208 disposed within recess 220 of casing 204. As shown in FIG. 14 and FIG. 17, charging regulator 206 may be configured to be oriented within casing 204 such that a charging port 256 is aligned with first aperture 222. In some embodiments, first aperture 222 may comprise a plurality of charging ports 256, such that the plurality of charging ports 256 are configured to fit a plurality of charging components 214. In some embodiments, the plurality of charging components 214 comprise a plurality of charging pins configured to fit within the plurality of charging ports 256. In addition, charging ports 256 may be configured to receive electrical power. As used herein, the term "charging ports 256" refers to any charging receipts/receivers (e.g., a female USB-C cable, wireless transceiver, or a female charging pin) known to a person of ordinary skill in the art. For ease of reference, the exemplary embodiment described herein denotes charging ports 256 as a female charging pin, but this description should not be interpreted as exclusionary of other charging receipts.

In some embodiments, charging regulator 206 may be configured to supply the predetermined voltage and current to mobile computing device 202 and/or payment receiver 208 wirelessly. In this manner, charging regulator may include a first wireless connector and some embodiments may include a second wireless connector. The first wireless connector or the second wireless connector may be configured to wirelessly charge the payment receiver 208 and/or the mobile computing device 202. As used herein, the term "wireless connector" refers to any uncoupled charging connectors known in the art. The wireless connector may comprise an electromagnetic inductive charging pad, a radiative electromagnetic resonant charging bowl, or an uncoupled radio frequency wireless charging component. For ease of reference, the exemplary embodiment described herein denotes wireless connector as an electromagnetic inductive charging pad, but this description should not be interpreted as exclusionary of other wireless charging connectors.

Furthermore, charging regulator 206 may be configured to supply voltage and current to merchant payment system 200. In some embodiments, charging regulator 206 may be configured to provide a first predetermined voltage and current and a second predetermined voltage and current to mobile computing device 202 and payment receiver 208, respectively. In some embodiments, charging regulator 206 may be configured to supply only the first predetermined voltage and current to both mobile computing device 202 and payment receiver 208. In some embodiments, charging regulator 206 may be configured to supply only the second predetermined voltage and current to both mobile computing device 202 and payment receiver 208.

FIGS. 18-22 depict a docking station 212 comprising a plurality of distinct carriages 262 configured to be temporarily coupled to a plurality of channels 260. Each of the plurality of distinct carriages 262 comprises a device receipt 270. Docking station 212 is configured to electrically connect to a power source via port 211, in order to supply a predetermined voltage and current to one or more carriages 262. In addition, device receipt 270 may have a size and shape configured to receive casing 204 housing mobile computing device 202, charging regulator 206, and/or payment receiver 208 in a predetermined orientation (e.g., horizontal).

In some embodiments, charging component 214 may reside within device receipt 270, such that charging component 214 is in electrical communication with docket station 212. Charging component 214 may be configured to charge the predetermined device as the predetermined device is disposed within device receipt 270. In some embodiments, multiple mobile computing devices 202 may be disposed within docking station 212, simultaneously. Additionally, docking station 212 may be configured to electrically connect to a power source, such that the power source supplied the docking station with a predetermined voltage and current. In some embodiments, docking station 212 may include charging component 214, where charging component 214 may be configured to provide predetermined electrical voltage and current to charging regulator 206.

Figure 18:
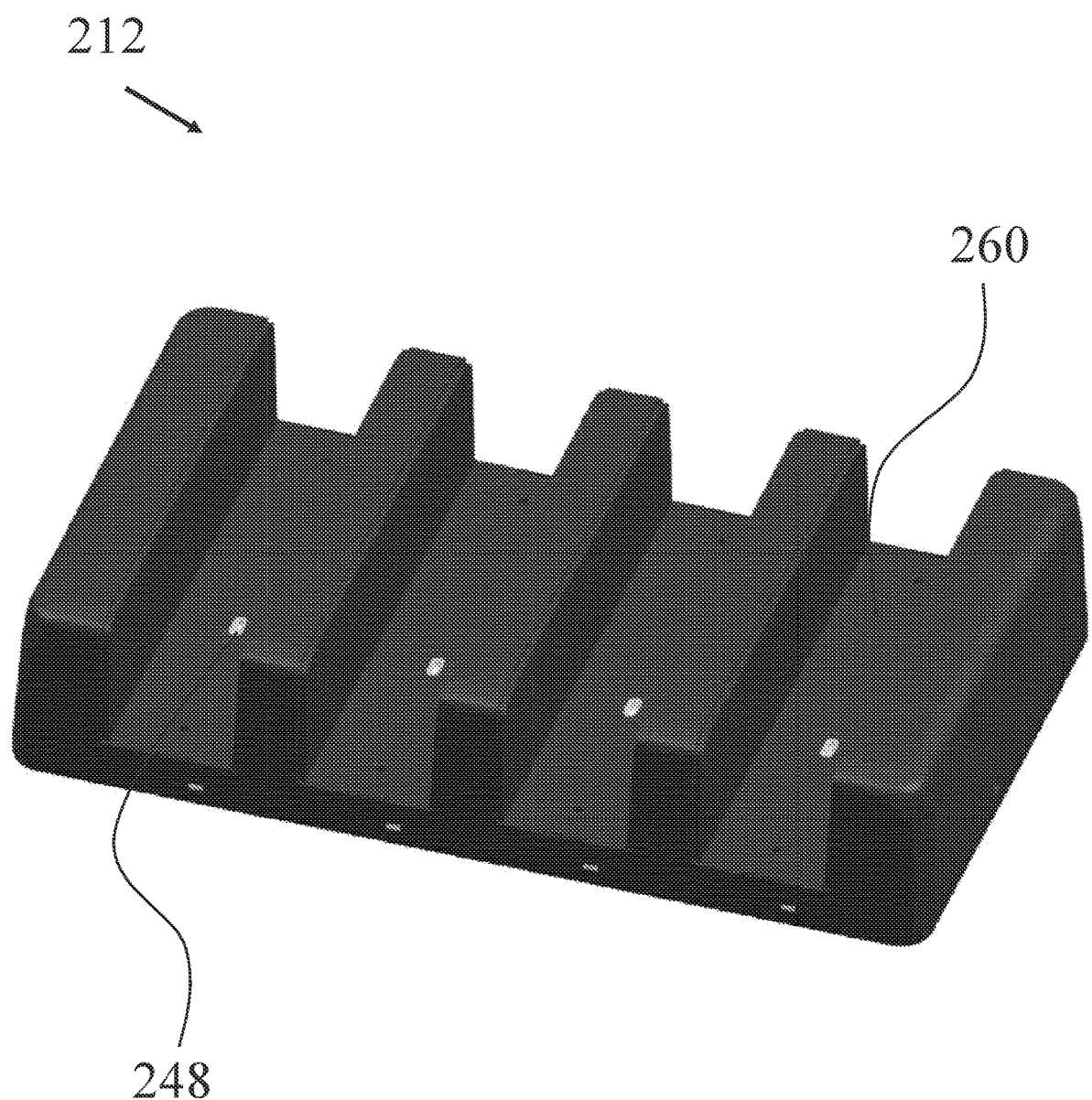
FIG. 18 is a perspective view of a docking station with a plurality of channels according to embodiments of the present disclosure.
Figure 19:
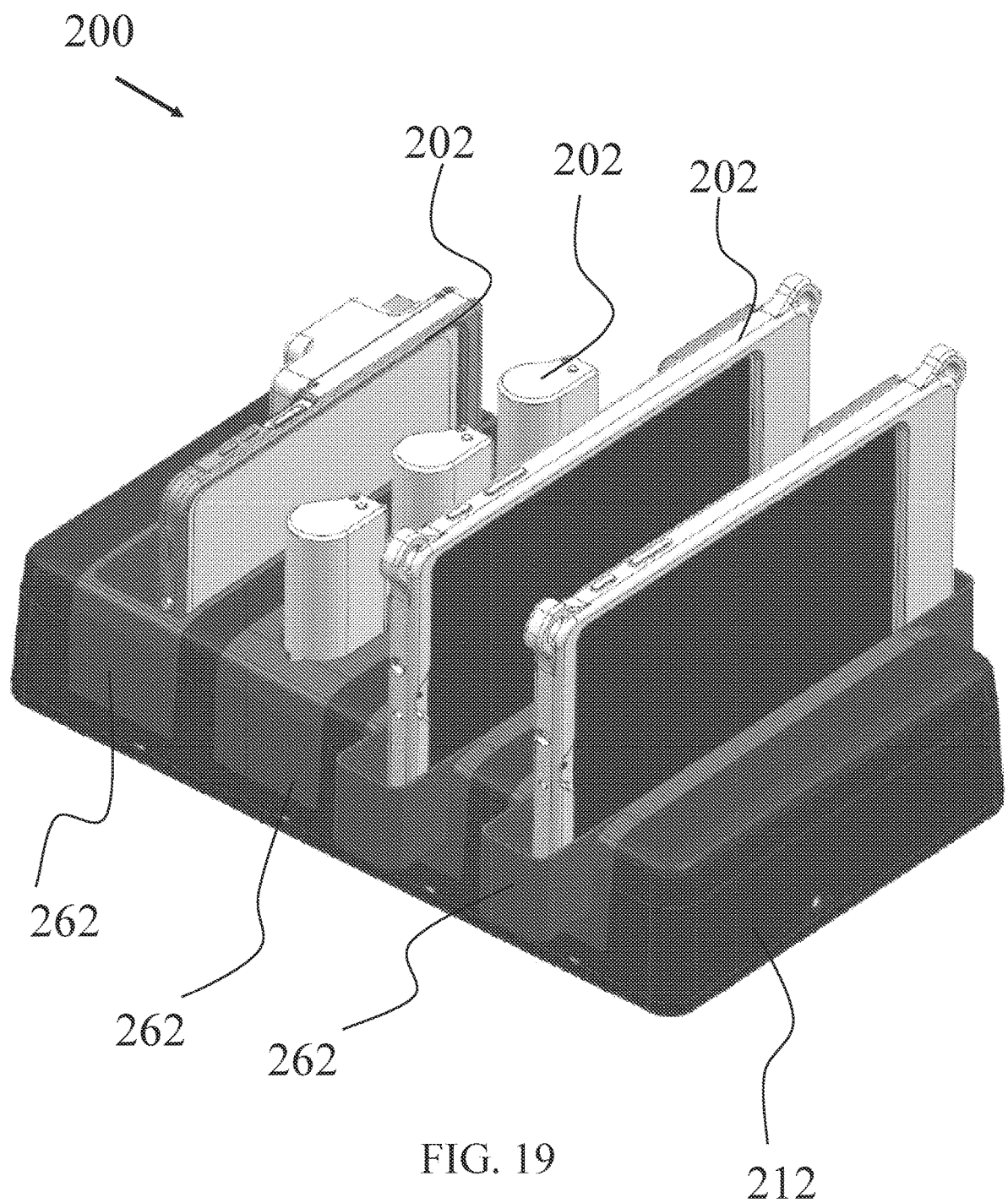
FIG. 19 is a perspective view of a plurality of channels disposed within a docking station according to embodiments of a present disclosure.

FIGS. 18-19 further depict charging regulator 206 in the predetermined orientation, such that charging component 214 may be configured to transfer the predetermined electrical voltage and current to charging regulator 206. In some embodiments, the plurality of carriages 262 may be sized and shaped individually to receive a casing 204 housing a specifically formed mobile computer device 202 (e.g., a tablet or a phone), charging regulator 206, and/or payment receiver 208.

Figure 20:
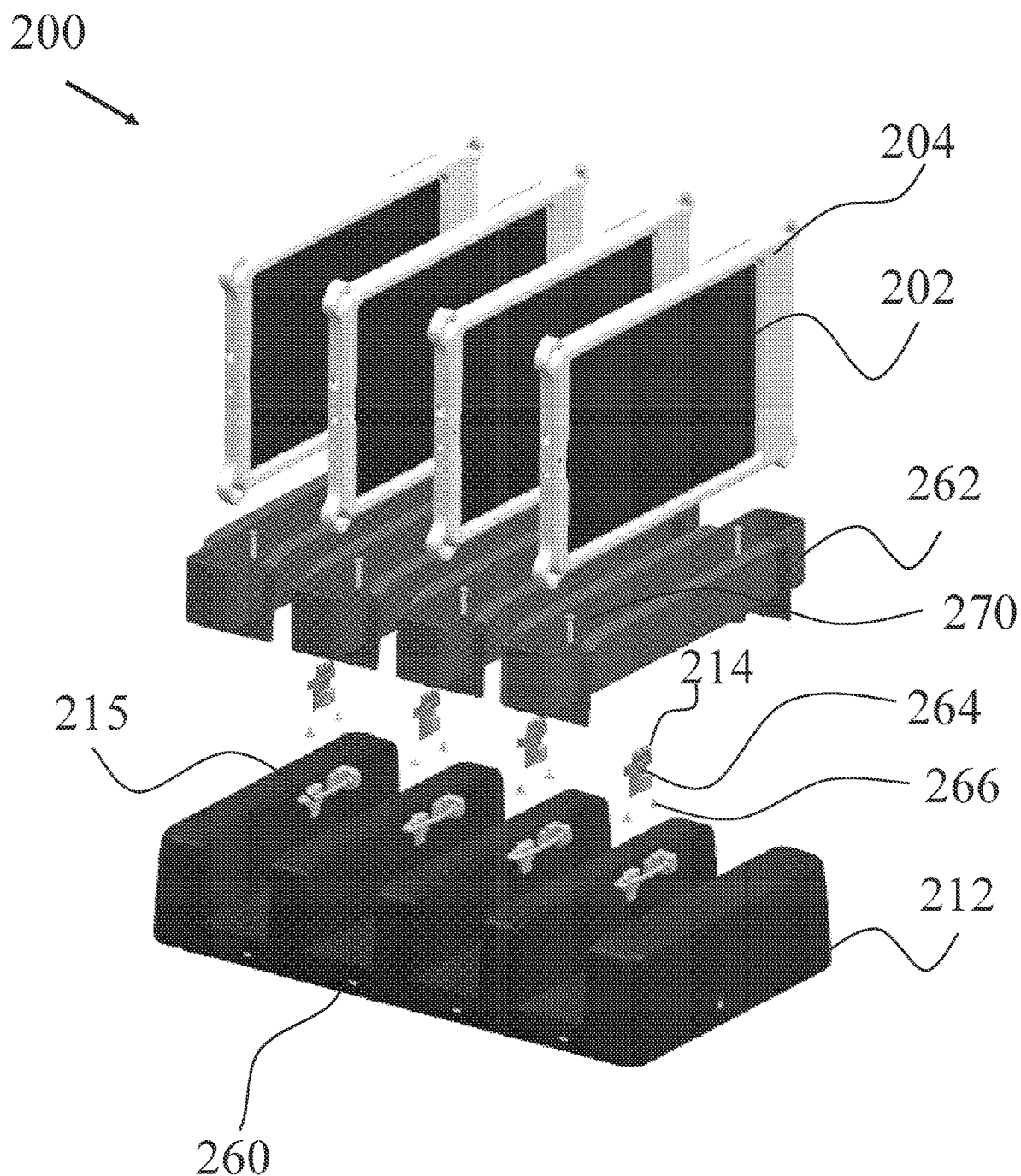
FIG. 20 is a perspective view of an embodiment of a docking station configured to house a mobile computing device (e.g., a tablet).
Figure 21:
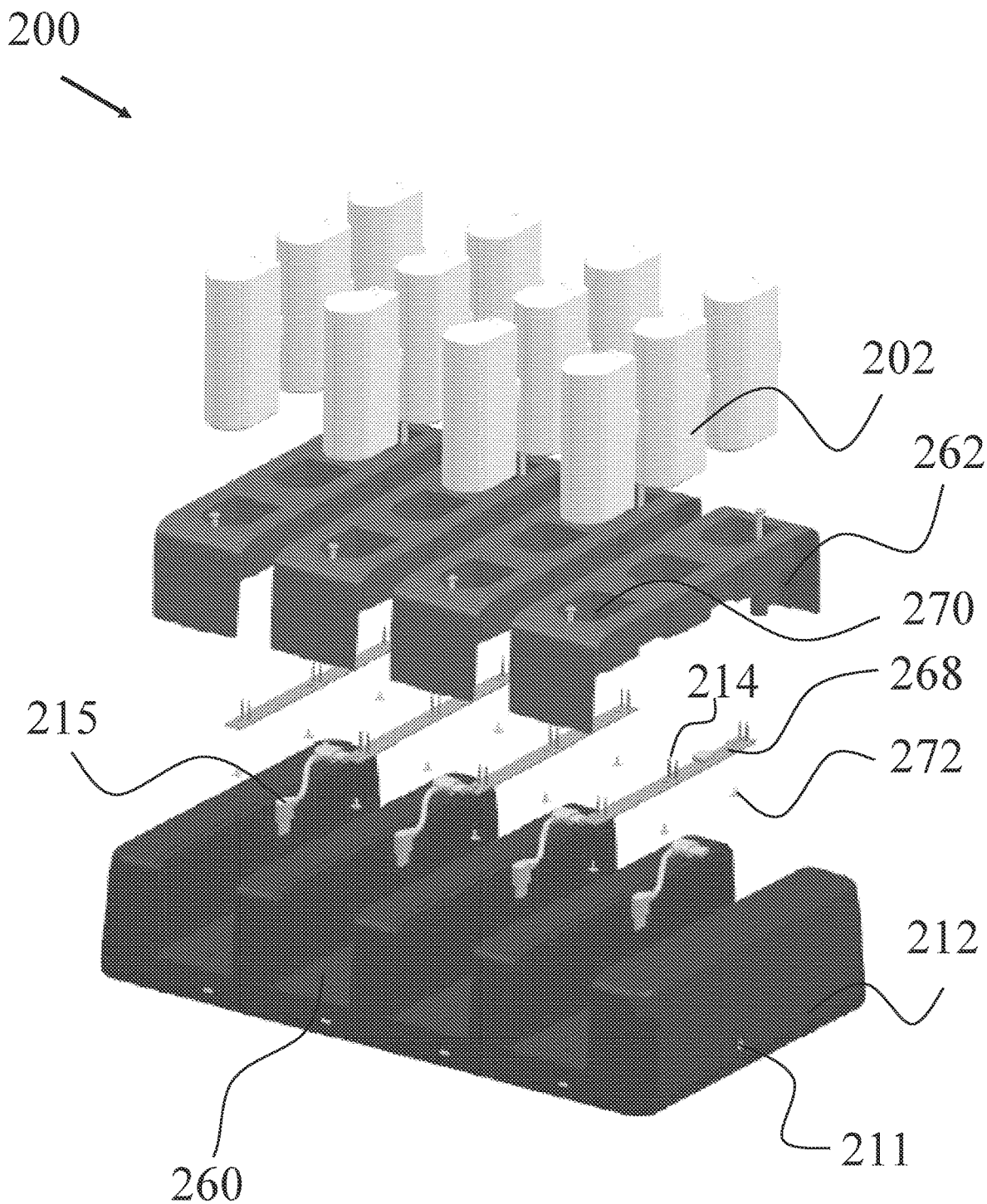
FIG. 21 is a perspective view of an embodiment of a docking station configured to house a battery according to embodiments of the present disclosure.
Figure 22:
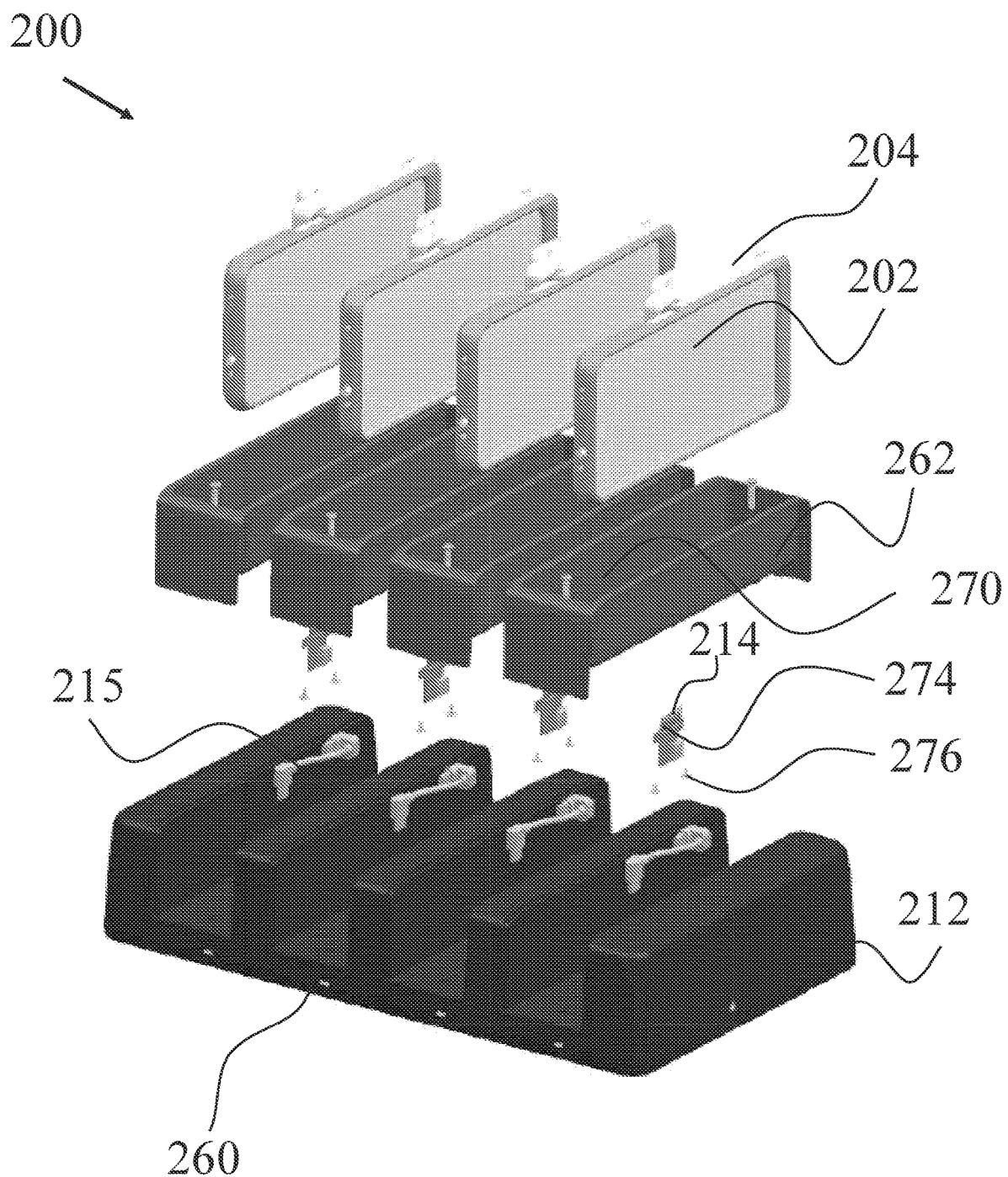
FIG. 22 is a perspective view of an embodiment of a docking station configured to house a mobile computing device (e.g., a mobile phone).

As depicted in FIG. 18, some embodiments include intermediate charging port 248 residing in the plurality of channels 260. Intermediate charging ports 248 include electric circuitry to transfer electrical power from docket station 212 through charging component 215 as shown in FIGS. 20-22. Charging components 215 are electrically connected to circuitry 264, 268, and/or 274, which are secured within a corresponding receipt 270 via fasteners 266, 270, 276, respectively. Each circuitry 264, 268, and 274 is specifically designed to include a charging component 214 designed for the device intended to reside within the corresponding device receipt 270 of carriage 262.

In addition, charging component 214 may vary in size and shape to couple to a form of mobile computing device 204 (e.g., a phone, a computer battery, or a tablet). In some embodiments charging component 214 extends upwardly into device receipt 270 and is configured to be aligned and received by charging port 256. In some embodiments, charging regulator 206 and docking station 210 may use alternative charging methods. In some embodiments, charging component 214 and charging port 256 may be configured to charge wirelessly. In some embodiments, mobile computing device 202 may comprise a charging regulator. In some embodiments, mobile computing device 202 may be configured and aligned to receive charging component 214.

Furthermore, the plurality of distinct carriages 262 includes a third aperture through which charging component 214 extends into the carriage, such that charging component 214 is in electrical communication with docking station 212 and is configured to charge the predetermined device when the predetermined device is disposed in the each of the plurality of distinct carriages 262. In some embodiments, at least one of plurality of distinct carriages 262 is configured to receive casing 204 housing mobile computing device 202, charging regulator 206, and/or payment receiver 208 in an orientation in which the charging component is in the location to allow the charging component to transfer the predetermined voltage or current to charging regulator 206.

In some embodiments, casing 204 housing mobile computing device 202, charging regulator 206, and/or payment receiver 208 may be configured to align in an alternative orientation (e.g., vertical) in response to an increase or decrease in the predetermined voltage and current required by mobile computing device 202, charging regulator 206, or payment receiver 208. In some embodiments, casing 204 housing mobile computing device 202, charging regulator 206, and/or payment receiver 208 may be configured to align in an alternative orientation (e.g., vertical) in response to changes in location of charging port 256.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all the generic and specific features of the invention herein described, and all statements of the scope of the invention that, as a matter of language, might be said to fall therebetween.

What is claimed is:

1. A merchant payment system, comprising:
   a casing, the casing further including:
   a front body section interconnected with a rear body section;
   the casing configured to securely retain a mobile computing device, a payment receiver, and a charging regulator;
   a first aperture disposed in the casing;
   a user interface aperture disposed in the front body;
   the payment receiver configured to be disposed within the casing;
   the mobile computing device further including:
   a user interface, wherein the user interface is positioned in an orientation aligned with the user interface aperture in the casing when the mobile device is disposed in the casing, such that the user interface is accessible via the user interface aperture;
   the charging regulator configured to be disposed within the casing, the charging regulator further including:
   a first electrical connector configured to be coupled to the payment receiver;
   a second electrical connector configured to be coupled to the mobile computing device;
   a charging port configured to receive electrical power;
   wherein the charging regulator is configured to be oriented within the casing such that the charging port is aligned with the first aperture;
   a docking station configured to electrically connect to a power source, the docking station further including:
   a channel having a size and shape configured to receive the casing when the mobile computing device, payment receiver, and charging regulator are disposed within the casing; and
   a charging component configured to provide electrical power to the charging regulator.

2. The merchant payment system of claim 1, wherein the first aperture in the casing is comprised of a plurality of charging ports.

3. The merchant payment system of claim 2, wherein the docking station comprises a plurality of charging components configured to fit within the plurality of charging ports in the casing.

4. The merchant payment system of claim 1, wherein the casing further includes a payment receipt aperture with a chip reader slot for a payment card.

5. The merchant payment system of claim 4, wherein the payment receipt further includes a payment instrument swiping slot.

6. The merchant payment system of claim 1, wherein the charging regulator provides the mobile computing device with a first predetermined voltage and current.

7. The merchant payment system of claim 6, wherein the charging regulator provides the payment receiver with a second predetermined voltage and current.

8. The merchant payment system of claim 1, further including:
   a plurality of distinct carriages, wherein each carriage is configured to reside within one of the plurality of channels in the docking station, each of the plurality of distinct carriages including:
   a device receipt, wherein the device receipt has a size and shape configured to receive a predetermined device in a particular orientation;
   an aperture through which the charging component extends into the device receipt, wherein the charging component is in electrical communication with the docking station and is configured to charge the predetermined device when the predetermined device is disposed in the device receipt;
   wherein one of the plurality of distinct carriages is configured to receive the casing housing the mobile computing device, payment receiver, and charging regulator in an orientation in which the charging component is in the location to allow the charging component to transfer electrical power to the charging regulator.

9. The merchant payment system of claim 8, further including:
   a power transferring component configured to transfer electrical power between the docking station and a plurality of charging components extending into at least one of the plurality of distinct carriages;
   the charging regulator including a plurality of charging ports;
   wherein the predetermined orientation of the casing includes the charging regulator receiving the plurality of charging components within the plurality of charging ports.

10. A merchant payment system, comprising:
    a docking station configured to electrically connect to a power source, the docking station further including a plurality of channels;
    a casing, the casing further including:
    a front body section and a rear body section;
    a receiving space configured to securely retain a mobile computing device, a payment receiver, and a charging regulator;
    a user interface aperture disposed in the front body section;
    the payment receiver configured to receive payment information from a payment device;
    the mobile computing device further including:
    a user interface, wherein the user interface is positioned in an orientation aligned with the user interface aperture in the casing when the mobile device is disposed in the casing, such that the user interface is accessible via the user interface aperture;
    the charging regulator configured to be disposed within the casing and receive power from the docking station, the charging regulator further including:
    a first electrical connector configured to be coupled to the payment receiver;

a second electrical connector configured to be coupled to the mobile computing device;

wherein the charging regulator is configured to be oriented within the casing such that the charging regulator receives power from the docking station.

11. The merchant payment system of claim 10, further including:

a plurality of distinct carriages, wherein each carriage is configured to reside within one of the plurality of channels in the docking station, each of the plurality of distinct carriages including:

a device receipt, wherein the device receipt has a size and shape configured to receive a predetermined device in a predetermined orientation;

a charging component residing within the device receipt, wherein the charging component is in electrical communication with the docking station and is configured to charge the predetermined device when the predetermined device is disposed in the device receipt; and wherein one of the plurality of distinct carriages is configured to receive the casing housing the mobile device, payment receiver, and charging regulator in an orientation in which the charging component residing within the device receipt transfers electrical power to the charging regulator.

12. The merchant payment system of claim 10, further including a plurality of charging ports disposed through the casing.

13. The merchant payment system of claim 12, wherein the docking station comprises a plurality of charging components configured to fit within the plurality of charging ports receipts.

14. The merchant payment system of claim 10, further including a payment receipt aperture in the case, wherein the payment receipt aperture comprised at least one of a chip reader slot for a payment card or a payment card swiping slot.

15. The merchant payment system of claim 10, wherein the charging regulator provides the mobile computing device with a first predetermined voltage and current.

16. The merchant payment system of claim 15, wherein the charging regulator provides the payment receiver with a second predetermined voltage and current.

17. The merchant payment system of claim 10, further including:

a power transferring component configured to transfer electrical power between the docking station and a plurality of charging components extending into at least one of the plurality of distinct carriages;

the charging regulator including a plurality of charging ports;

wherein the predetermined orientation of the casing includes the charging regulator receiving the plurality of charging pins within the plurality of charging pin receipts.

18. A merchant payment system, comprising:

a docking station configured to electrically connect to a power source, the docking station further including a channel;

a casing, the casing further including:

a front body section and a rear body section;

a receiving space configured to securely retain a mobile computing device, a payment receiver, and a charging regulator;

a user interface aperture disposed in the front body section;

the payment receiver configured to receive payment information from a payment device;

the mobile computing device further including:

a user interface, wherein the user interface is positioned in an orientation aligned with the user interface aperture in the casing when the mobile device is disposed in the casing, such that the user interface is accessible via the user interface aperture;

the charging regulator configured to be disposed within the casing and receive power from the docking station, the charging regulator further including:

a first electrical connector configured to be coupled to the payment receiver;

a second electrical connector configured to be coupled to the mobile computing device;

wherein the charging regulator is configured to be oriented within the casing such that the charging regulator receives power from the docking station;

a plurality of distinct carriages, wherein each of the plurality of distinct carriages configured to be temporarily affixed to the channel in the docking station and includes:

a device receipt configured to receive a predetermined device in a predetermined orientation;

a charging component residing within the device receipt, wherein the charging component is in electrical communication with the docking station and is configured to charge the predetermined device when the predetermined device is disposed in the device receipt;

wherein one of the plurality of distinct carriages is configured to receive the casing housing the mobile device, payment receiver, and charging regulator and charge the charging regulator.

19. The merchant payment system of claim 18, wherein the intake opening is configured to detect a payment instrument within a first predefined distance.

20. The merchant payment system of claim 19, wherein the charging regulator is configured to supply a predetermined voltage and current to the payment receiver, thereby activating the payment receiver, such that responsive to the intake opening detecting the payment instrument, the payment receiver is configured to output a first electric signal, indicating the payment receiver is being engaged by the monetary instrument.

* * * * *